US007010747B1

(12) United States Patent
Perttunen

(10) Patent No.: US 7,010,747 B1
(45) Date of Patent: Mar. 7, 2006

(54) METHOD AND SYSTEM FOR FULL TEXT SEARCH OF PURCHASABLE BOOKS THAT MAKE THE FULL TEXT INACCESSIBLE TO USERS

(76) Inventor: Cary D. Perttunen, 11764 Raintree Ct., Shelby Township, MI (US) 48315

( * ) Notice: Subject to any disclaimer, the term of this patent is extended or adjusted under 35 U.S.C. 154(b) by 740 days.

(21) Appl. No.: 10/077,840

(22) Filed: Feb. 16, 2002

Related U.S. Application Data

(63) Continuation of application No. 09/243,595, filed on Feb. 3, 1999, now Pat. No. 6,359,635.

(51) Int. Cl.
 *G06F 15/00* (2006.01)
(52) U.S. Cl. ........................................ 715/738; 715/853
(58) Field of Classification Search ................ 715/853, 715/854, 765, 753
 See application file for complete search history.

(56) References Cited

U.S. PATENT DOCUMENTS

| | | | |
|---|---|---|---|
| 5,596,699 A | 1/1997 | Driskell | |
| 5,675,733 A | 10/1997 | Williams | |
| 5,798,760 A | 8/1998 | Vayda et al. | |
| 5,805,167 A | 9/1998 | van Cruyningen | |
| 5,943,039 A | 8/1999 | Anderson et al. | |
| 5,987,469 A | 11/1999 | Lewis et al. | |
| 6,104,400 A | 8/2000 | Halachmi et al. | |
| 6,144,958 A | 11/2000 | Ortega et al. | |
| 6,144,962 A | 11/2000 | Weinberg et al. | |
| 6,169,986 B1 * | 1/2001 | Bowman et al. | 707/5 |
| 6,266,649 B1 | 7/2001 | Linden et al. | |
| 6,285,367 B1 | 9/2001 | Abrams et al. | |
| 6,317,722 B1 | 11/2001 | Jacobi et al. | |
| 6,359,635 B1 | 3/2002 | Perttunen | |
| 6,366,910 B1 | 4/2002 | Rajaraman et al. | |
| 6,401,084 B1 | 6/2002 | Ortega et al. | |
| 6,418,441 B1 * | 7/2002 | Call | 707/10 |
| 6,460,033 B1 | 10/2002 | Perttunen | |
| 6,563,521 B1 | 5/2003 | Perttunen | |
| 6,606,619 B1 | 8/2003 | Ortega et al. | |

OTHER PUBLICATIONS

Kirkpatrick, "Amazon Plan Would Allow Searching Texts of Many Books", The New York Times, Jul. 21, 2003, pp. C1 and C6, vol. CLII, No. 52,551.

Johnson et al., Applied Multivariate Statistical Analysis, 1982, pp. 532-573, Prentice-Hall, Englewood Cliffs.

Tucker, Applied Combinatorics, Second Edition, 1984, pp. 28-31 and 80-131, John Wiley & Sons, New York.

Luger et al., Artificial Intelligence and the Design of Expert Systems, 1989, pp. 88-99, Benjamin/Cummings Publishing, Redwood City.

CRC Standard Mathematical Tables and Formulae, 29th Edition, 1991, pp. 106-107, CRC Press, Boca Raton.

(Continued)

Primary Examiner—Cao (Kevin) Nguyen

(57) ABSTRACT

A search expression is received. A first plurality of values is determined for a corresponding plurality of purchasable items. Each of the first plurality of values is based on a similarity between the search expression and its corresponding one of the purchasable items. A second plurality of values is determined for a corresponding plurality of pairs of the purchasable items. Each of the second plurality of values is based on a similarity between two purchasable items in a corresponding one of the pairs. A corresponding optimum path between the search expression and each of a subset of the purchasable items is determined based on at least one of the first plurality of similarity values and at least one of the second plurality of similarity values.

23 Claims, 10 Drawing Sheets

OTHER PUBLICATIONS

American Heritage Dictionary of the English Language, Third Edition, 1992, inside back cover, Houghton Mifflin, Boston.

"The best chart type for my data," help screen from Microsoft Excel for Windows 95, 1995.

Using Visio Products, 1997, pp. 119-122, 185-202 and 207-232, Visio Corporation, Seattle.

Hyman, Dynamic HTML for Dummies, 1997, pp. 63-79, IDG Books, Foster City.

Lehto et al., Official Microsoft FrontPage 98 Book, 1997, pp. 32-52, Microsoft Press, Redmond.

Tittel et al., HTML 4 for Dummies, 1998, pp. 12-13 and 283-293, IDG Books, Foster City.

"Aurigin Announces General Availability of Version 6.0 of its Intellectual Property Asset Management System," Web page from Aurigin Systems, Oct. 1998.

"The Brain," Web page from PC Magazine Online, Apr. 1998.

* cited by examiner

METHOD AND SYSTEM FOR FULL TEXT SEARCH OF PURCHASABLE BOOKS THAT MAKE THE FULL TEXT INACCESSIBLE TO USERS

CROSS-REFERENCE TO RELATED APPLICATIONS

The present application is a continuation of application Ser. No. 09/243,595, filed Feb. 3, 1999, now U.S. Pat. No. 6,359,635, whose disclosure is hereby incorporated by reference into the disclosure of the present application.

BACKGROUND OF THE INVENTION

1. Field of the Invention

The present invention relates to methods, articles and apparatus for visibly representing information, and methods, articles and apparatus for providing an input interface.

2. Description of the Related Art

Various approaches to visibly representing information are given on pp. 532–573 of R. A. Johnson and D. W. Wichern, *Applied Multivariate Statistical Analysis*, Prentice-Hall Inc., 1982, which is hereby incorporated by reference into this disclosure. These approaches include shaded distance matrices, dendograms, multidimensional scaling plots, stars, Andrews plots and Chernoff faces.

Pie charts are also used for visually representing numerical information. Many software packages, including VISIO® Standard 5.0 and Microsoft Excel for Windows 95, provide means for creating a pie chart using a computer. An example of a pie chart is shown on pg. 26 of a manual which accompanies VISIO® Standard 5.0.

Doughnut charts may also be used for visually representing numerical information. A doughnut chart is similar to a pie chart, but may be used to visually represent more than one series of data. Microsoft Excel for Windows 95 provides means for creating a doughnut chart using a computer.

Graphs may be visually represented by dots corresponding to nodes of the graph, and lines corresponding to arcs of the graph. A planar graph may be visually depicted by a plane graph. Examples of these two representations are given on pp. 29–31 of A. Tucker, *Applied Combinatorics*, Second Edition, John Wiley & Sons, 1984, which is hereby incorporated by reference into this disclosure.

BRIEF DESCRIPTION OF THE DRAWINGS

The present invention is pointed out with particularity in the appended claims. However, other features are described in the following detailed description in conjunction with the accompanying drawings in which:

DETAILED DESCRIPTION OF THE PREFERRED EMBODIMENTS

Improved methods of representing information with a plurality of regions are disclosed herein. The regions may be visibly displayed to provide a visible representation of the information, and/or used to provide an input interface to allow a user-initiated selection of a portion of the information. Optionally, the regions may be printed to produce a hard copy representation of the information.

Figure 1:
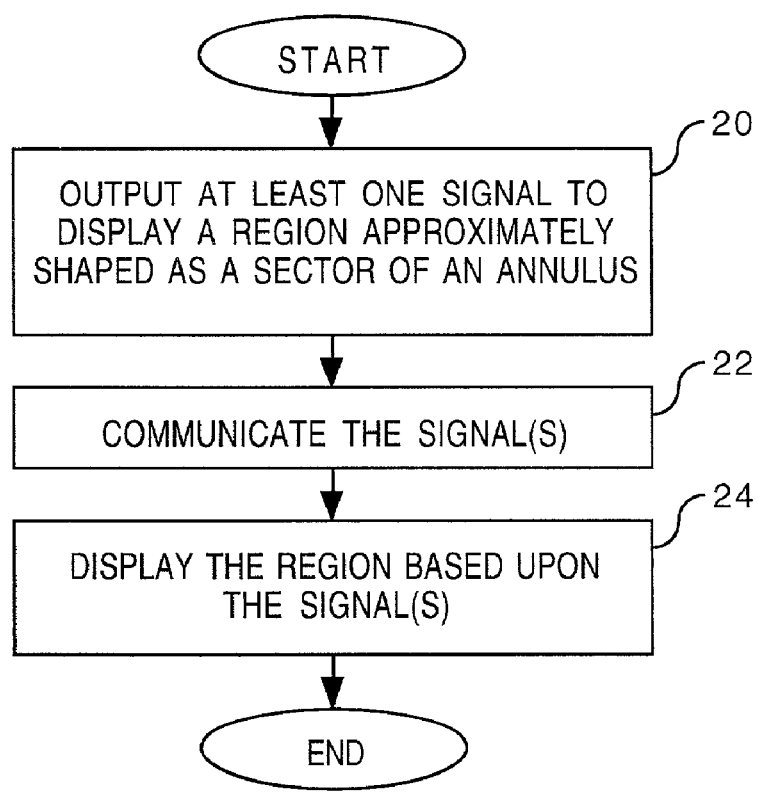
FIG. 1 is a flow chart of an embodiment of a method of visibly representing an element.

FIG. 1 and its associated disclosure teach preferred embodiments of shapes and regions to represent a single element. In practice, a plurality of these regions are used to represent a plurality of elements. The teachings made with reference to FIG. 1 are provided at the beginning of the detailed description section so that the herein-disclosed embodiments having plural regions can make reference thereto.

Much of this disclosure is made in terms of outputting at least one signal to display one or more regions. It is noted that either in addition to or as an alternative to outputting at least one signal to display the one or more regions as disclosed herein, a user interface may be provided so that the one or more regions are user-selectable. Preferably, the user interface is provided by outputting at least one signal, and optionally communicating the at least one signal to a computer or a like apparatus.

The at least one signal to provide the user interface may be communicated by a computer data signal. The computer data signal may be communicated via a computer network. Examples of the computer network include, but are not limited to, an intranet, an internet and an extranet. The computer data signal may include computer program code to assist in providing the user interface. Of particular interest is the signal being representative of code in a markup language such as HTML (hypertext markup language).

The at least one signal is communicated by a waveform representative thereof through a communication medium. Examples of the waveform and the communication medium include, but are not limited to, an optical waveform through an optical medium, an electronic waveform through an electronic medium, and an electromagnetic waveform through an electromagnetic medium.

FIG. 1 is a flow chart of an embodiment of a method of visibly representing an element. Examples of the element to be visibly represented are numerous. Examples of the element, and more generally of any herein-mentioned element, include but are not limited to a physical object, a purchasable item, a computer address, a computer site, a Web page, audio content, an image, computer software, an information category, an information subcategory, an information source, a logical disk for a computer, a computer directory, a computer-readable file, computer-readable data, a computer-readable message, a general category, a general subcategory, a patent claim, a node of a graph, a node of a tree, a leaf node of a tree, an individual, a job position, a state in a problem-solving process and non-geographical elements. In general, the specific type of element which is to be visibly represented is application-dependent.

As indicated by block 20, the method comprises outputting at least one signal to display a region approximately shaped as a sector of an annulus. Examples of the annulus sector include, but are not limited to, an approximately circular annulus sector, an approximately elliptical annulus sector, and a non-elliptical, annulus sector.

In describing shapes in this patent application, the term "annulus sector" is meant to be synonymous with "sector of an annulus". As such, an approximately circular annulus sector is meant to describe an approximate sector of a circular annulus. Similarly, an approximately elliptical annulus sector is meant to describe an approximate sector of an elliptical annulus. An approximately non-elliptical, annulus sector is meant to describe alternatively-shaped, approximately arcuate regions.

Preferably, the region is approximately definable by a first line segment, a second line segment, a first arc, and a second arc. For an approximately circular annulus sector, the first arc includes a first approximately circular arc and the second arc includes a second approximately circular arc. The first approximately circular arc is at least partially definable by a first center point and a first radius. The second approximately circular arc is at least partially definable by a second center point and a second radius. Preferably, the first center point and the second center point are located substantially at the same point. It is further preferred that the first radius and the second radius differ so that the region has a radial width.

The first approximately circular arc is further definable by a first starting angle and either a first ending angle or a first arc angle. The second approximately circular arc is further definable by a second starting angle and either an second ending angle or a second arc angle. Preferably, the first arc angle and/or the second arc angle are non-zero so that the region has an angular width. Also preferably, the first starting angle is substantially the same as the second starting angle, the first ending angle is substantially the same as the second ending angle, and the first arc angle is substantially the same as the second arc angle.

Further for an approximately circular annulus sector, the first line segment and the second line segment are preferably oriented substantially radially with respect to a point. Preferably, this point is located substantially at the first center point and the second center point. In this case, it is also preferred that the first line segment be oriented substantially radially with respect to the point at an angle substantially the same as the first starting angle and the second starting angle, and that the second line segment be oriented substantially radially with respect to the point at an angle substantially the same as the first ending angle and the second ending angle.

For an approximately elliptical annulus sector, the first arc includes a first approximately elliptical arc and the second arc includes a second approximately elliptical arc. As is well known, a perfect ellipse is a set of points in a plane whose distances from two fixed focal points in the plane have a constant distance sum. An approximately elliptical arc approximates an arc of the perfect ellipse.

Also well known is that the ellipse defines a major axis and a minor axis. The term "semiminor axis" is used to denote half of a dimension of the ellipse measured along the minor axis. The term "semimajor axis" is used to denote half of a dimension of the ellipse measured along the major axis. The term "half distance between focal points" is self-descriptive, and is equal to the square root of the sum of the squared semiminor axis and the squared semimajor axis.

An ellipse is definable in a variety of ways. Examples of parameter combinations to define an ellipse having either a horizontal or vertical major axis include, but are not limited to: (i) the semimajor axis, the semiminor axis, and coordinates of a center point; (ii) the semimajor axis, the half distance between focal points, and coordinates of the center point; (iii) the semiminor axis, the half distance between focal points, and coordinates of the center point; (iv) the semimajor axis and coordinates of the focal points; (v) the semiminor axis and coordinates of the focal points; and (vi) the distance sum and coordinates of the focal points. As is recognizable by those having ordinary skill, other parameter combinations can be used to define a general ellipse.

The first approximately elliptical arc is at least partially definable by a first center point. The second approximately elliptical arc is at least partially definable by a second center point. Preferably, the first center point and the second center point are located at substantially the same point. It is also preferred that the first line segment and the second line segment be oriented substantially radially with respect to a point substantially the same as the first center point and the second center point.

An angular width of the region may be defined by either an angular difference between the first line segment and the second line segment, an angle swept by the first approximately elliptical arc with respect to the first center point, or an angle swept by the second approximately elliptical arc with respect to the second center point.

A radial width of the region may be defined by either a length of the first line segment, a length of the second line segment, or a distance between the first approximately elliptical arc and the second approximately elliptical arc along a radial axis.

The first approximately elliptical arc is at least partially definable by a first semimajor axis and a first semiminor axis. The second approximately elliptical arc is at least partially definable by a second semimajor axis and a second semiminor axis. Preferably, the difference between the first semimajor axis and the second semimajor axis is approximately equal to the difference between the first semiminor axis and the second semiminor axis. Either difference may be considered as a radial width of the region.

Alternatively, the first approximately elliptical arc and the second approximately elliptical arc can share substantially common focal points. In particular, a first pair of focal points which can at least partially define the first approximately elliptical arc may be substantially co-located with a second pair of focal points which can at least partially define the second approximately elliptical arc.

For a non-elliptical annular sector, the region is a general, approximately arcuate region. In this case, the first arc and the second arc can assume a wide variety of forms. Examples include, but are not limited to, an approximately parabolic arc, an approximately hyperbolic arc, an approximately bow-shaped arc, and other approximate curved arcs.

An angular width of the region may be defined by either an angular difference between the first line segment and the second line segment, an angle swept by the first arc with respect to a point, or an angle swept by the second arc with respect to a point.

A radial width of the region may be defined by either a length of the first line segment, a length of the second line segment, or a distance between the first arc and the second arc along a radial axis from a point.

It is noted that use of the terms "approximate" and "approximately" for the herein-disclosed regions, shapes, and curves include non-perfect representations of said regions, shapes, and curves using a display device and/or an input device. For example, a pixel-based display device can display a plurality of discrete pixels to approximate any of the herein-disclosed regions, shapes, and curves. As another example, a display device may distort an intended region, shape, or curve to produce an approximation thereof. Examples of this distortion include, but are not limited to, a distortion due to pixel aspect ratio, a distortion due to a non-planar display screen, and a distortion due to rasterization.

Approximations of regions, shapes, and curves may also be generated in software or firmware. For example, a curve may be represented by a piecewise approximation. An example of a piecewise approximation of a curve includes, but is not limited to, a piecewise linear approximation. Further examples include a curve being approximated by a simplified equation therefor, and a curve being approximated by a plurality of display points. Examples of ways to approximate a shape or a region include, but are not limited to, using a plurality of points to approximate the shape or region, and using a polygon to approximate the shape or region.

Use of discrete parameter values to represent a region, shape, or curve also may result in an approximation thereof. For example, a circular arc may be represented by an integral center coordinate, an integral radius, an integral start angle, and an integral arc width. In this case, and other cases, either round-off or truncation of parameter values to comply with a discrete representation results in an approximation of a desired region, shape, or curve.

Optionally, the region is displayed to have an area based upon a value associated with the element. Examples of values associated with any herein-mentioned element include, but are not limited to, a price of the element, a similarity value of the element with a search expression, a size of the element, and other properties of the element. More specific examples of interest include, but are not limited to, a price of a purchasable item, a similarity value of a computer-readable file with a search expression, a similarity value of a purchasable item with a search expression, a size of a computer-readable file, and a size of a computer directory. It is noted that the aforementioned value is also referred to herein as a weight value.

Optionally, the region is displayed to have a dimension based upon the value associated with the element. Examples of the dimension include, but are not limited to, a width, a length, a radial width, an angular width, an arc length, and a chord length.

Optionally, the region is displayed to have a visible display property based upon the value associated with the element. Examples of the visible display property include, but are not limited to, an interior color of the region, an interior gray scale of the region, an interior fill pattern for the region, a color bordering the region, an image within the region, and text within the region.

As indicated by block 22, the method optionally comprises communicating the at least one signal. The at least one signal is communicated by a waveform representative thereof through a communication medium. Examples of the waveform and the communication medium include, but are not limited to, an optical waveform through an optical medium, an electronic waveform through an electronic medium, and an electromagnetic waveform through an electromagnetic medium.

Examples of the at least one signal include, but are not limited to, a display signal and a computer data signal. The display signal may be communicated either through a video cable or wirelessly to a display device. The computer data signal may be communicated via a computer network. Examples of the computer network include, but are not limited to, an intranet, an internet and an extranet. The computer data signal may include computer program code to assist in displaying the region. Of particular interest is the at least one signal being representative of code in a markup language such as HTML (hypertext markup language).

As indicated by block 24, the method optionally comprises displaying the region based upon the at least one signal. The region may be displayed by a display device. Examples of the display device include, but are not limited to, a computer monitor, a television, a liquid crystal display, a cathode ray tube, and a gas plasma display. For a computer data signal, the at least one signal is received by a computer in communication with the computer network. The computer generates a display signal to display the region on the display device.

It is noted that if the element is associated with a geographical region, the display region preferably is not shaped like the shape of the geographical region.

Figure 2:
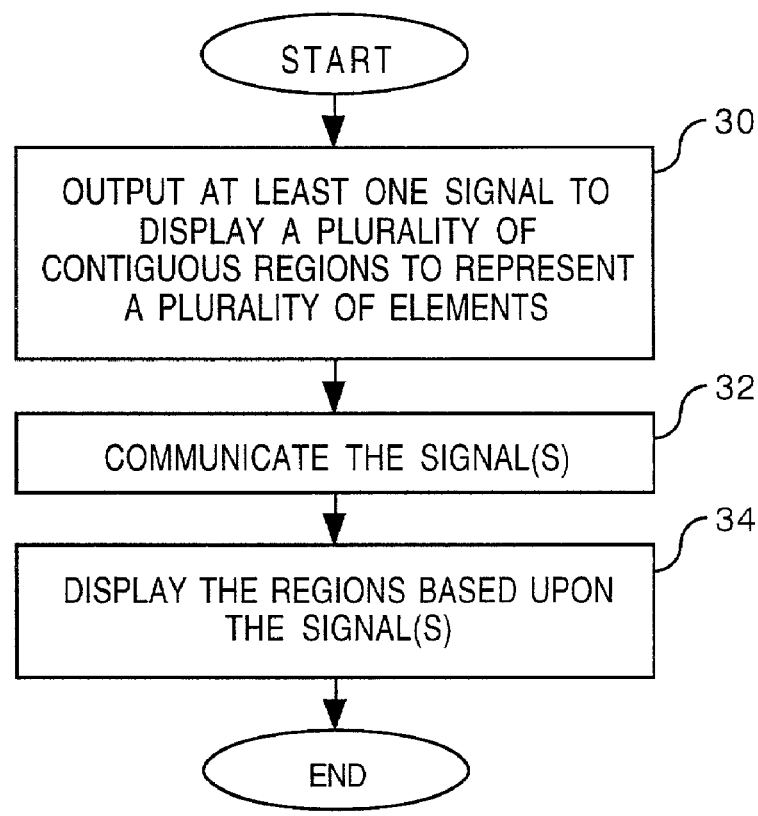
FIG. 2 is a flow chart of an embodiment of a method of visibly representing a plurality of elements.

FIG. 2 is a flow chart of an embodiment of a method of visibly representing a plurality of elements. As indicated by block 30, the method comprises outputting at least one signal to display a plurality of contiguous regions to represent the plurality of elements. In the context of this disclosure, the term "contiguous" is broadly inclusive of describing the plurality of regions as being either neighboring or adjacent throughout the resulting visible representation. For example, adjacent pairs of regions may be spaced apart slightly.

The plurality of contiguous regions may define an identifiable boundary at its periphery. Examples of the boundary defined by the plurality of contiguous regions include, but are not limited to, an approximately circular boundary, an approximately elliptical boundary, an approximately parabolic boundary, an approximately hyperbolic boundary, an approximately bow-shaped boundary, any approximately curved boundary, an approximately linear boundary, and an approximately piecewise linear boundary. It is noted that the boundary may span an angle of either less than 180 degrees, about equal to 180 degrees, greater than 180 degrees but less than 360 degrees, or about equal to 360 degrees.

Preferably, each of the contiguous regions adjacent the boundary comprises a distinct region having any of the forms described with reference to FIG. 1. Those of the contiguous regions which are non-adjacent the boundary may comprise distinct regions having any of the forms described with reference to FIG. 1, or may have a different form. Examples of different forms for a non-adjacent region include, but are not limited to, an approximate sector of a circle, an approximate sector of an ellipse, an approximate sector of a non-elliptical ovular shape, an approximate segment of a circle, an approximate segment of an ellipse, an approximate parabolic segment, an approximate hyperbolic segment, and any segment formed from an approximate curve and a chord.

Optionally, each of the contiguous regions adjacent the boundary represents a respective element of a desired subset of the elements. For example, if the plurality of elements include a plurality of nodes of a tree, the contiguous regions adjacent the boundary may represent the leaf nodes of the tree.

If the plurality of elements include a plurality of nodes of a plurality of trees, for example, the contiguous regions adjacent the boundary may represent leaf nodes for all of the trees. Alternatively, the contiguous regions adjacent the boundary may represent the root nodes of the plurality of trees, for example.

Having each of the contiguous regions adjacent the boundary represent a respective element of a desired subset of the elements is desirable to facilitate human identification of the desired subset. For example, a user can identify the leaf nodes of a tree by viewing which regions are adjacent the boundary.

To assist a human in scanning his/her view across the plurality of contiguous regions which are adjacent the boundary, each of boundary-adjacent regions may be adjacent at most two other boundary-adjacent regions. Further, each boundary-adjacent region may be adjacent exactly two other boundary-adjacent regions. In this case, the user can cyclically scan through the boundary-adjacent regions. Alternatively, two of the boundary-adjacent regions may be adjacent only one other boundary-adjacent region.

Optionally, each of the plurality of contiguous regions has either substantially the same area or a substantially same dimension. As another option, each of a subset of the plurality of contiguous regions has either substantially the same area or a substantially same dimension. In this case, for example, each of the boundary-adjacent regions may have either substantially the same area, substantially equal arc lengths, substantially equal radial widths, or substantially equal angular widths. A further example of this case includes each of the regions representing leaf nodes of a tree having either substantially the same area, substantially equal arc lengths, substantially equal radial widths, or substantially equal angular widths.

It is noted that there are various scenarios in which regions having strictly unequal areas have substantially the same area. Examples of sources of deviation in areas which still provide substantially the same area include, but are not limited to, approximations used to display the regions (see the discussion herein of "approximate" and "approximately"), approximations in the mathematical processes used to calculate the areas and/or the parameters which define the regions, and round-off and/or truncation errors in the mathematical processes used to calculate the areas and/or the parameters which define the regions. These and other sources of error also apply to substantially equal dimensions.

As another option, each of the plurality of contiguous regions may have an area or a dimension based upon a value associated with its corresponding one of the elements. As yet another option, each of a subset of the plurality of contiguous regions may have an area or a dimension based upon a value associated with its corresponding one of the elements. In this case, for example, each of the boundary-adjacent regions may have a respective value-based area or dimension. A further example of this case includes each of the regions representing leaf nodes of a tree having a respective value-based area or dimension.

For any of the above-listed, value-based regions, each region may have an area or dimension which is monotonically related to its value or weight value. For example, consider a first region representing a first element with a first value, and a second region representing a second element with a second value. If the first value is greater than the second value, the first region may have a first area greater than a second area of the second region. Alternatively, if the first value is greater than the second value, the first region may have a first angular width greater than a second angular width of the second region. It is noted that various functions, including linear and non-linear functions, can be used to dictate the area and/or dimension of a region based upon its corresponding value.

As indicated by block 32, the method optionally comprises communicating the at least one signal. The at least one signal is communicated by a waveform representative thereof through a communication medium. Examples of the at least one signal, waveform, and communication medium are given with reference to block 22 in FIG. 1. As indicated by block 34, the method optionally comprises displaying the regions based upon the at least one signal.

Figure 3:
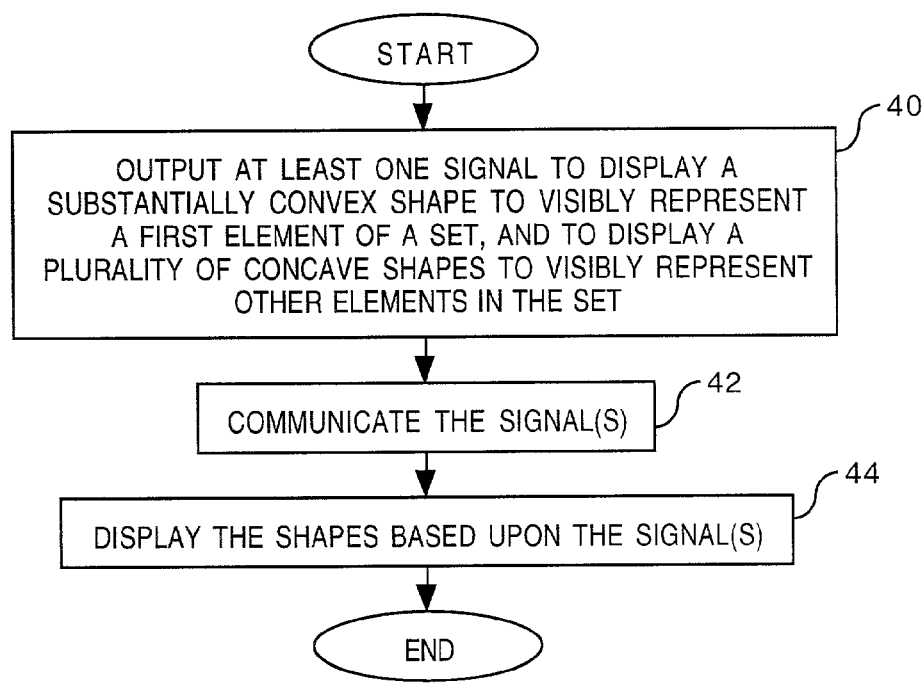
FIG. 3 is a flow chart of another embodiment of a method of visibly representing a plurality of elements.

FIG. 3 is a flow chart of another embodiment of a method of visibly representing a set of a plurality of elements. As indicated by block 40, the method comprises outputting at least one signal to display a substantially convex shape to visibly represent a first element of the set, and to display a plurality of concave shapes to visibly represent a plurality of other elements in the set. It is noted that, in general, this act does not preclude another element in the set being displayed as a substantially convex shape, and does not imply necessarily that all other elements in the set absent the first element must be displayed as a substantially convex shape.

It is further noted that a shape need not be precisely convex to be substantially convex. Examples of insubstantial concavities in a substantially convex shape include, but are not limited to, those which may result from an approximation of the shape or a curve which at least partially defines the shape, and those present where endpoints of two curves imprecisely meet.

Visibly representing the first element with the first substantially convex shape is beneficial in promoting rapid user identification of a predetermined element of the set. For example, the set of elements may comprise a set of nodes of a graph, and the first element may comprise a predetermined node from the set.

Of particular interest is where the first element comprises a root node of a tree. In this case, the root node is visibly represented by a substantially convex shape. Each of a plurality of descendant nodes from the root node is represented by a respective, concave shape.

In general, the concave shapes can have a variety of different forms and display locations. Preferably, however, each of the concave shapes has a form described with reference to FIG. 1. It is also preferred that the plurality of concave shapes be displayable in accordance with the description referring to FIG. 2.

In general, the substantially convex shape can have a variety of different forms, sizes, and display locations with respect to the concave shapes. Of particular interest is a substantially convex shape at least partially defined by an arc. Examples of the arc include those described with reference to FIG. 1. Preferably, the substantially convex shape is defined by either a closed arc, an arc and a single line, or an arc and two radial lines.

In a first preferred form, the substantially convex shape is at least partially defined by at least a portion of an approximate circle. In this case, at least one, and preferably all, of the concave shapes may comprise an approximate sector of a circular annulus. It is further preferred that at least one approximate sector of a circular annulus be adjacent the substantially convex shape near the portion of the approximate circle. Examples of the substantially convex shape having this first preferred form include, but are not limited to, an approximate sector of a circle, and approximately an entire circle.

In a second preferred form, the substantially convex shape is at least partially defined by at least a portion of an approximate ellipse. In this case, at least one, and preferably all, of the concave shapes may comprise an approximate sector of a elliptical annulus. It is further preferred that at least one approximate sector of an elliptical annulus be adjacent the substantially convex shape near the portion of the approximate ellipse. Examples of the substantially convex shape having this second preferred form include, but are not limited to, an approximate sector of an ellipse, and approximately an entire ellipse.

Optionally, each of the plurality of concave shapes has substantially the same area. As another option, each of a subset of the plurality of concave shapes has substantially the same area. As a further option, each of the plurality of concave shapes has substantially the same area as the substantially convex shape.

As an alternative option, each of the concave shapes and the substantially convex shape may have either a value-based area or dimension as described with reference to FIG. 2.

As indicated by block 42, the method optionally comprises communicating the at least one signal. The at least one signal is communicated by a waveform representative thereof through a communication medium. Examples of the at least one signal, waveform, and communication medium are given with reference to block 22 in FIG. 1. As indicated by block 44, the method optionally comprises displaying the regions based upon the at least one signal.

Figure 4:
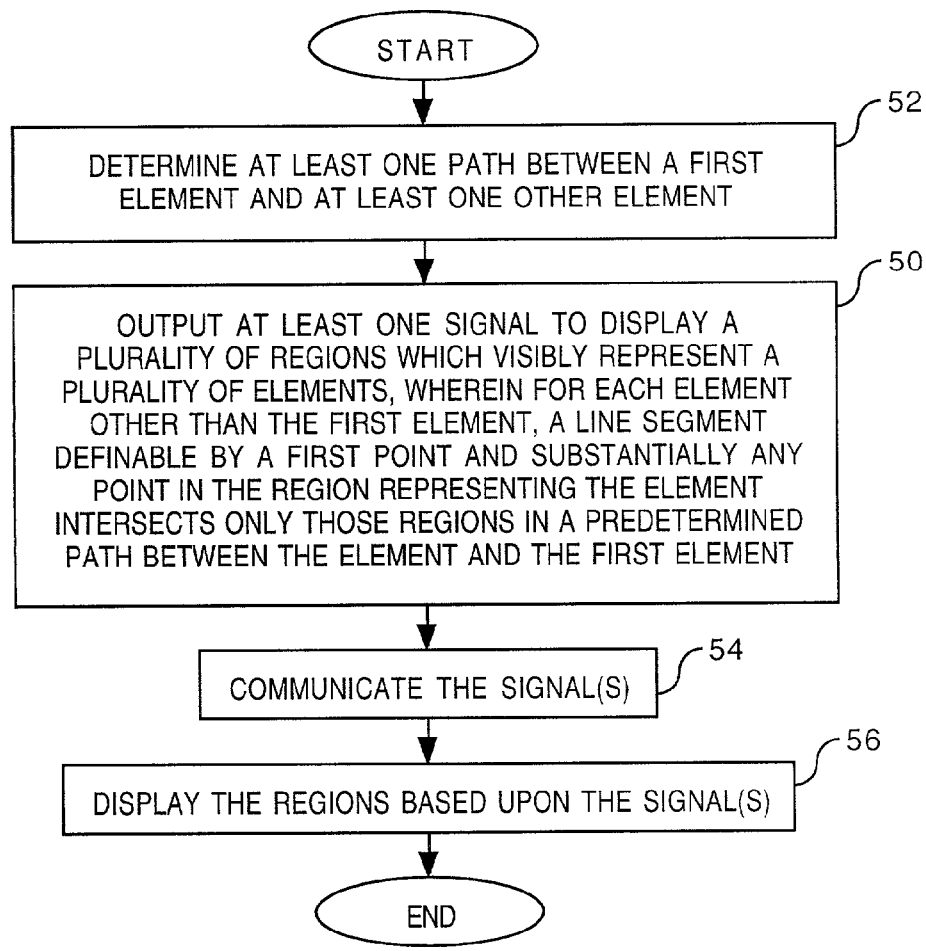
FIG. 4 is a flow chart of yet another embodiment of a method of visibly representing a plurality of elements.

FIG. 4 is a flow chart of yet another embodiment of a method of visibly representing a plurality of elements. As indicated by block 50, the method comprises outputting at least one signal to display a plurality of regions which visibly represent a plurality of elements including a first element. The plurality of regions include a first region to visibly represent the first element. The plurality of regions further visibly represent a plurality of predetermined paths in relation to the first element. The predetermined paths are represented as follows: for each element of the plurality of elements other than the first element, a line segment definable by a first point and substantially any point in the region representing the element intersects only those regions representing an element in the predetermined path between the element and the first element. Preferably, the plurality of regions are contiguous, although this condition is not necessary.

The first point may be within a region representing the first element, or may be exterior to the region representing the first element. The first point may be fixed, or may vary in dependence upon the location of the other point.

In a first preferred use of this embodiment, the region representing the first element is substantially convex, and each region of the plurality of regions other than the region representing the first element is concave. In this case, the plurality of regions may be displayable according to teachings made with reference to FIG. 3. For example, the region representing the first element may comprise a sector of an approximate ellipse, and each region of the plurality of regions other than the region representing the first element may comprise a sector of an approximately elliptical annulus. As another example, the region representing the first element may comprise a sector of an approximate circle, and each region of the plurality of regions other than the region representing the first element may comprise a sector of an approximately circular annulus.

In a second preferred use of this embodiment, each region of the plurality of regions is concave. In this case, it is further preferred, although optional, to have each region of the plurality of regions comprise a sector of an approximately elliptical annulus, a sector of an approximately circular annulus, or another concave region or shape.

Optionally, each of the plurality of regions other than the region representing the first element has substantially the same area or a substantially same dimension. As a further option, each of the plurality of regions may have substantially the same area or a substantially same dimension.

As an alternative option, each of the plurality of regions other than the region representing the first element may have either an area or a dimension based upon a respective value associated with its corresponding element. As a further option, each of the plurality of regions including the region representing the first element may have either an area or a dimension based upon a respective value or weight value associated with its corresponding element.

Desirabilities of this method are evident by the following practical applications. In one class of practical applications, an optional act of determining at least one, and more preferably all, of the plurality of predetermined paths is performed as indicated by block 52. All of the predetermined paths may be determined prior to outputting the at least one signal in block 50. Alternatively, the at least one signal can comprise at least one subsignal outputted before the act of block 50 is complete.

At least one of the predetermined paths can be determined by determining a shortest path (or, more generally, an optimum path) between the first element and at least one of the plurality of elements other than the first element. Here, if desired, a plurality of shortest paths (or, more generally, optimum paths) can be found, wherein each shortest path is between the first element and a corresponding one of the plurality of elements other than the first element. As is known in the art of network algorithms, examples of algorithms to compute the shortest paths include, but are not limited to, Dijkstra's algorithm and Floyd's algorithm. Those having ordinary skill can review shortest path algorithms on pp. 123–127 of A. Tucker, *Applied Combinatorics*, Second Edition, John Wiley & Sons, 1984, which is hereby incorporated by reference into this disclosure.

By displaying the regions based upon the at least one signal outputted in block 52, a line segment definable by substantially any point in a second region representing a second element and a point within the region representing the first element intersects only those regions representing an element in the shortest path (or optimum path) between the second element and the first element.

Another approach to determining the plurality of predetermined paths includes determining a spanning tree having the plurality of elements. Examples of the spanning tree include, but are not limited to, an optimum spanning tree such as a minimum spanning tree, and a search tree. As is known in the art of network algorithms, examples of algorithms to compute a minimum spanning tree include, but are not limited to, Kruskal's algorithm and Prim's algorithm.

Those having ordinary skill can review minimum spanning trees on pp. 127–131 of A. Tucker, *Applied Combinatorics*, Second Edition, John Wiley & Sons, 1984, which is hereby incorporated by reference into this disclosure. Examples of the search tree include, but are not limited to, a depth-first search spanning tree, a breadth-first search spanning tree, or a best-first search spanning tree. Those having ordinary skill can review search trees on pp. 80–122 of A. Tucker, *Applied Combinatorics*, Second Edition, John Wiley & Sons, 1984, which is hereby incorporated by reference into this disclosure.

By displaying the regions based upon the at least one signal outputted in block 52, each aforementioned line segment intersects only those regions representing an element in a tree-defined path between a corresponding element and the first element. Using tree terminology described in more detail with reference to FIG. 5, it is preferred that the regions include a region associated with a root element, at least two concave regions associated with at least two non-root, internal elements, and at least two regions associated with leaf elements. For each of at least two leaf elements, a linear path from substantially any point in the region associated with the leaf element intersects only those regions associated with an element in a corresponding tree-defined path between the leaf element and the root element. Preferably, at least one non-root, internal element has at least two others of the elements as its children in the tree.

As indicated by block 54, the method optionally comprises communicating the at least one signal. The at least one signal is communicated by a waveform representative thereof through a communication medium. Examples of the at least one signal, waveform, and communication medium are given with reference to block 22 in FIG. 1. As indicated by block 56, the method optionally comprises displaying the regions based upon the at least one signal.

Figure 5:
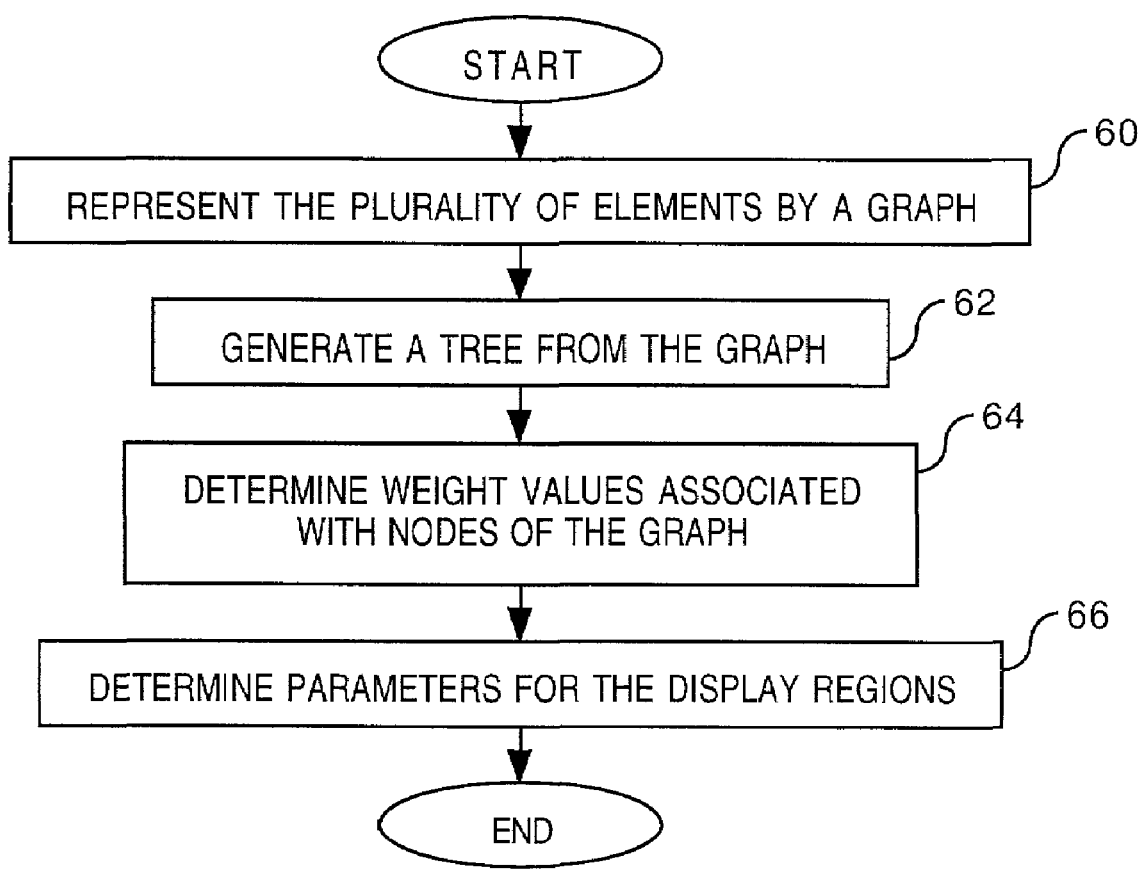
FIG. 5 is a flow chart of an embodiment of a method of determining a plurality of display regions to visibly represent a plurality of elements.

FIG. 5 is a flow chart of an embodiment of a method of determining a plurality of display regions to visibly represent a plurality of elements.

As indicated by block 60, the method comprises representing the plurality of elements by a graph. A graph is definable by a set of nodes and a set of edges joining or associating different pairs of distinct nodes. The edges in the graph may be either directed or undirected. It is noted that alternative terminology may be used to describe the graph. Examples of synonyms of "node" include, but are not limited to, "vertex" and "state". Examples of synonyms of "edge" include, but are not limited to, the terms "arc" and "link". Therefore, the herein-disclosed methods, articles, apparatus, and examples should not be limited by the selected terminology used to describe the graph.

Each element may be represented by a corresponding node of the graph. Relationships between elements may be represented by edges in the graph. Examples of edge-represented relationships are numerous. Examples of relationships between elements include, but are not limited to, a degree of similarity, a hyperlink, an associative link, a state of being an element of, a state of being contained in, a state of being associated with, a state of reporting to, a state of being in a category, a state of depending from, a state of being a reply to, and a step in a problem-solving process. In general, the specific type of element which is to be visibly represented is application-dependent.

As those having ordinary skill will recognize, various computer-readable data structures can be used to represent the graph in a computer-readable form using a computer-readable medium.

Before proceeding, a review of other graph-related terminology is provided. A first node is said to be adjacent to a second node if there is an edge from the first node to the second node. A path is definable by a sequence of nodes wherein each consecutive pair of nodes in the sequence is adjacent.

As indicated by block 62, the method optionally comprises generating a tree from the graph. In general, the graph may be either a tree or a non-tree. If the graph is a tree, this act need not be performed. However, if desired, the tree may be a subtree of a second tree. In general, the tree is a subgraph of the graph if this act is performed.

A tree is a graph having a unique path from a designated node, called a root node, to each of its other nodes. If the tree is undirected, then any of its nodes can be designated to be the root node. An undirected tree can be made into a directed tree by directing all edges away from the designated root node.

Each node in a directed tree, except for the root node, is a child node of a unique parent node from which an edge is directed thereto. Nodes having the same parent node are called siblings. Nodes of a directed tree with no children are called leaf nodes. Nodes having at least one child are called internal nodes.

As indicated by block 64, the method optionally comprises determining a plurality of weight values associated with the nodes. Each of the weight values is associated with a respective one of the nodes. The weight values need not be determined for cases in which each of the nodes has the same weight value. In these cases, a weight value of one may be assigned to each of the nodes.

As indicated by block 66, the method comprises determining parameters which define the display regions.

Figure 6:
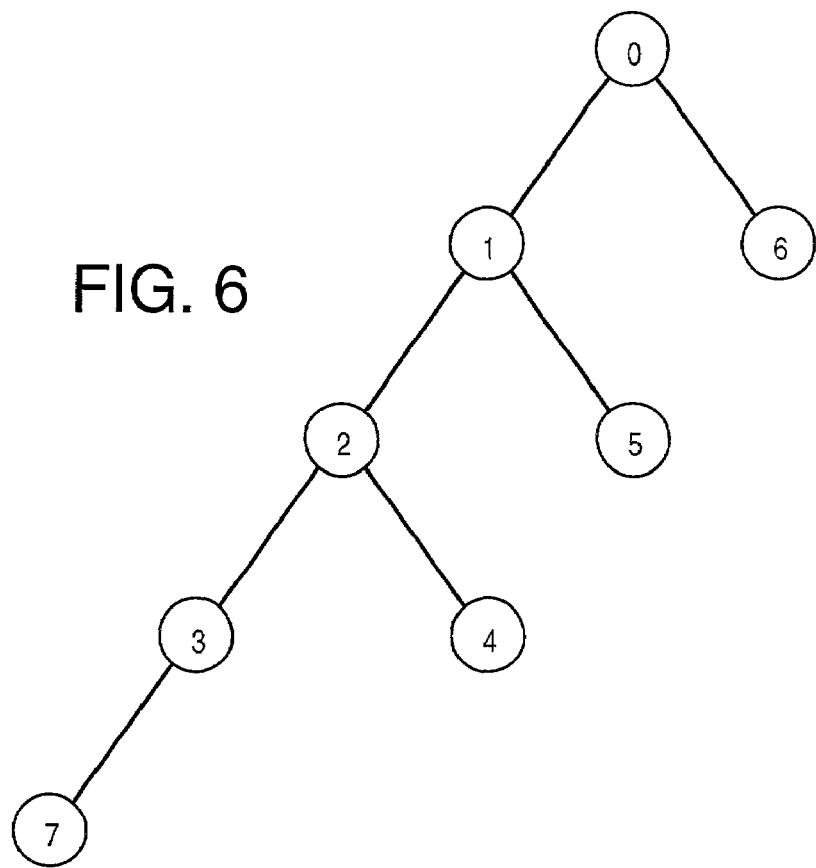
FIG. 6 schematically shows an example tree.

FIG. 6 schematically shows an example tree. Each node is represented by a circle. A number within a circle provides a numerical identifier for its represented node. A line between two circles represents an edge between two represented nodes. Node 0 is designated to be the root node in the tree.

TABLE I shows values involved in determining an embodiment of a plurality of display regions to visibly represent the tree of FIG. 6. The columns in TABLE I represent the following values: N represents a numerical identifier of the node, START_ANGLE represents the starting angle for arcs associated with the node, END_ANGLE represents the ending angle for arcs associated with the node, and OUTER_RADIUS represents the radius of the outer arc associated with the node.

TABLE I

| N | START ANGLE | END ANGLE | OUTER RADIUS |
|---|---|---|---|
| 1 | 0° | 154.3° | 10.408 |
| 2 | 0° | 123.4° | 13.462 |
| 3 | 0° | 82.3° | 17.047 |
| 4 | 82.3° | 123.4° | 20.000 |
| 5 | 123.4° | 154.3° | 20.000 |
| 6 | 154.3° | 180° | 20.000 |
| 7 | 0° | 82.3° | 20.000 |
| 0 | 0° | 180° | 7.071 |

Figure 7:
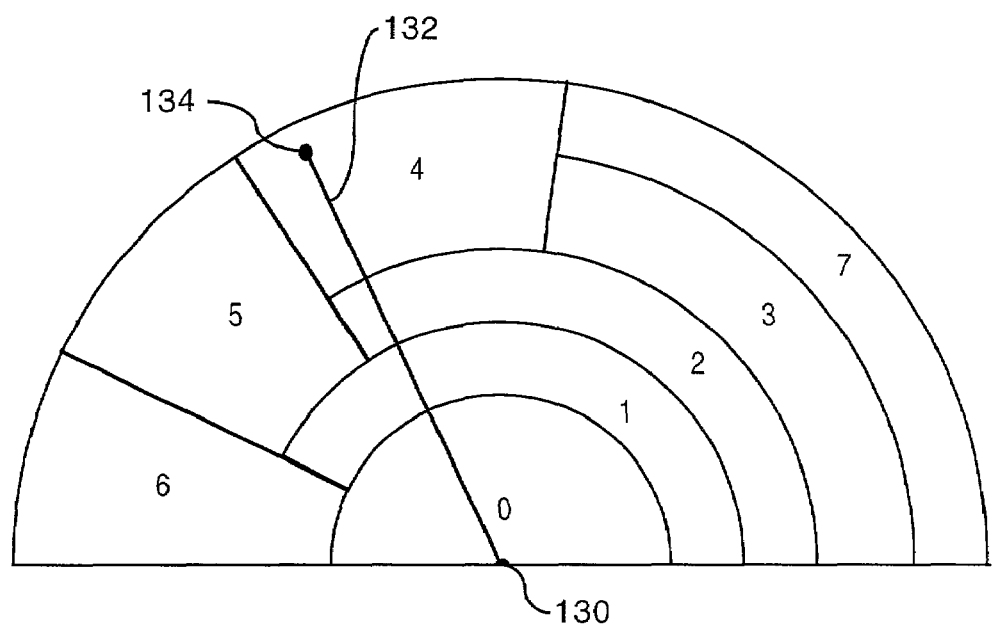
FIG. 7 shows a first embodiment of a plurality of regions to represent the example tree.

FIG. 7 shows the plurality of display regions defined by the values in TABLE I. The display regions are approximated by rounding the start angle and the end angle to an integral number of degrees, and rounding the outer radius to an integral number of display units.

As can be seen, the regions are contiguous. The region representing node 0 is substantially convex, and the regions representing nodes 1 to 7 are concave. More particularly, the region representing node 0 is approximately shaped as a sector of a circle, and the regions representing nodes 1 to 7 are approximately shaped as sectors of circular annuli. Each of the regions has approximately the same area.

Each edge in the tree is represented by a radial adjacency of two regions. For example, the tree-defined edge between nodes 1 and 2 is represented by the region representing node 1 being radially adjacent the region representing node 2. As another example, the tree-defined edge between nodes 1 and 5 is represented by the region representing node 1 being radially adjacent the region representing node 5. The tree-defined edge between nodes 2 and 4 is represented by the region representing node 2 being radially adjacent the region representing node 4.

In this embodiment, angular adjacency of regions implies that their corresponding nodes are non-adjacent in the tree. For example, since the region representing node 5 is angularly adjacent the regions representing nodes 2 and 4, node 5 is non-adjacent nodes 2 and 4 in the tree.

A line segment definable by substantially any point in any region and a point 130 in the region representing node 0 intersects only those regions representing a node in the tree-defined path to or from node 0. For example, a line segment 132 between the point 130 and a point 134 in the region representing node 4 intersects regions representing nodes 4, 2, 1 and 0. It is noted that the points 130 and 134, and the line segment 132 either may or may not be displayed with the regions.

A region representing a node has an angular width greater than or equal a sum of angular widths of any combination of regions representing children of the node. For example, the angular width of the region representing node 1 is substantially equal to the sum of the angular widths of the regions representing nodes 2 and 5.

As illustrated, the regions may have different radial widths. For example, the radial width of the region representing node 5 is greater than the radial width of the region representing node 2.

The regions representing the leaf nodes of the tree, namely the regions representing nodes 6, 5, 4 and 7, are contiguous. Each of these regions is defined by two line segments and two arcs. The line segments are oriented substantially radially with respect to the point 130. The arcs are definable by center points substantially located at the point 130.

Each of the regions representing leaf nodes is adjacent at most two other regions representing leaf nodes. In this embodiment, these regions define an approximately circular boundary. Two of the regions representing leaf nodes are adjacent only one other region representing a leaf node.

Alternative visible representations can be formed using regions having the same shapes and sizes as the regions in FIG. 7, but having different locations and orientations. In the visible representation of FIG. 7, the regions are ordered to represent nodes 6, 5, 4 and 7 from left to right of the boundary. The aforementioned alternative visible representations may have regions ordered at the boundary to represent any one of the following sequences of nodes: 4-7-5-6, 5-4-7-6, 5-7-4-6, 6-4-7-5, 6-5-7-4, 6-7-4-5, and 7-4-5-6. In each of these alternative visible representations, an edge is represented by a radial adjacency of two regions.

It is noted that the scope of this disclosure should not be limited by the example provided in FIG. 7. Clearly, this disclosure provides numerous approaches to visibly representing one or more elements. As such, FIG. 7 can be modified in accordance with any of the teachings herein. For example, the regions representing nodes 1 to 7 may be displayed with alternative concave shapes, the region representing node 0 may be omitted or may be displayed with an alternative substantially convex shape, at least one adjacent pair of regions may be spaced apart slightly, the boundary of the regions may be alternatively shaped, at least one region may be alternatively positioned, and at least one region may have alternative dimensions.

It is also noted that the visible representation in FIG. 7 may be used to visibly represent associations between pairs of elements represented by angularly adjacent regions. Here, for example, the visible representation in FIG. 7 may represent a planar graph comprising the tree of FIG. 6 and additional edges between nodes 7 and 4, nodes 3 and 4, nodes 4 and 5, nodes 5 and 6, node 2 and 5, and nodes 1 and 6.

Further, it is noted that the visible representation in FIG. 7 may be used to represent elements which are not necessarily related by the tree in FIG. 6. Here, for example, the visible representation in FIG. 7 may represent a graph or a tree wherein each edge is represented by an angular adjacency of two regions. In this case, for example, the angular adjacency of regions may imply that their corresponding nodes are non-adjacent in the graph or tree.

Because of the variation in dimensions of the regions, it may not be humanly apparent that the regions have substantially the same area. Optionally, the parameters which define the regions may be selected to make at least some of the relative areas more humanly apparent. In this case, it is preferred that the greatest radial width of any of the regions be about equal to either the greatest arc length or the greatest chord length (i.e. the greatest distance between endpoints of an arc) of any of the regions.

In the example of FIG. 7, the region representing node 6 has the greatest displayed radial width, and the region representing node 7 has the greatest displayed arc length and the greatest displayed chord length. Therefore, in this example, the parameters which define the regions may be modified so that the radial width of the region representing node 6 is about equal to either the arc length or the chord length of the region representing node 7.

With continuing reference to FIG. 7, it is noted that although the region representing node 7 has the greatest displayed arc length, the region representing node 2 has the greatest theoretical arc length. This is a result of the round-off error when discretizing the radii. Either the greatest displayed arc length or the greatest theoretical arc length may be employed when considering dimensions of the regions.

To achieve the result of having the greatest arc length be about equal to the greatest radial width, the MAXIMUM_ARC_ANGLE value may be multiplied by the greatest arc length divided by the greatest radial width. The resulting value is used as the MAXIMUM_ARC_ANGLE value to determine the angles defining the regions. The radii defining the regions are unaffected by the change in the MAXIMUM_ARC_ANGLE.

In many applications, it may not be critical that the greatest arc length be equal to the greatest radial width. Therefore, the MAXIMUM_ARC_ANGLE can be otherwise dependent on at least one feature of the information which is to be visibly represented. In this case, the MAXIMUM_ARC_ANGLE may automatically vary from a first visible representation of a first set of elements to a second visible representation of a second set of elements.

Various alternative embodiments of regions to represent the example tree of FIG. 6 are illustrated in FIGS. 8 to 13. In each of these alternative embodiments, an edge between two nodes is represented by a radial adjacency of two regions representing the two nodes. Although each of these embodiments is shown to have an overall angular width of about 180 degrees, it is noted that the overall angular width may span, in general, an angle of either less than 180 degrees, about equal to 180 degrees, greater than 180 degrees but less than 360 degrees, or about equal to 360 degrees.

Figure 8:
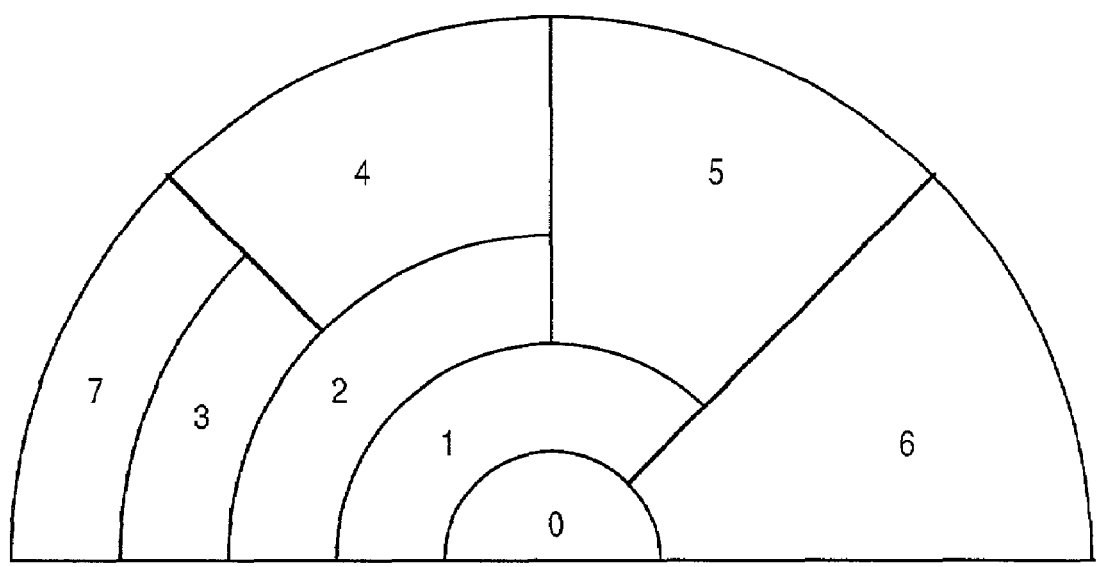
FIG. 8 shows a second embodiment of a plurality of regions to represent the example tree.

FIG. 8 shows a second embodiment of a plurality of regions to represent the example tree. In this embodiment, the region representing node 0 is substantially convex, and the regions representing nodes 1 to 7 are concave.

Radial widths of the regions representing nodes 1, 2, 3 and 7 are approximately equal, and are approximately equal to the radius of an approximate circle defining the region representing node 0. The radial width of the region representing node 4 is approximately equal to the sum of the radial widths of the regions representing nodes 7 and 3. The radial width of the region representing node 5 is approximately equal to the sum of the radial widths of the regions representing nodes 4 and 2. The radial width of the region representing node 6 is approximately equal to the sum of the radial widths of the regions representing nodes 5 and 1.

Angular widths of the regions representing leaf nodes 7, 4, 5 and 6 are approximately equal. An angular width of each region representing a parent node is approximately equal to the sum of angular widths of regions representing its children. For example, the angular width of the region representing node 2 is approximately equal to the sum of the angular widths of the regions representing nodes 3 and 4.

Figure 9:
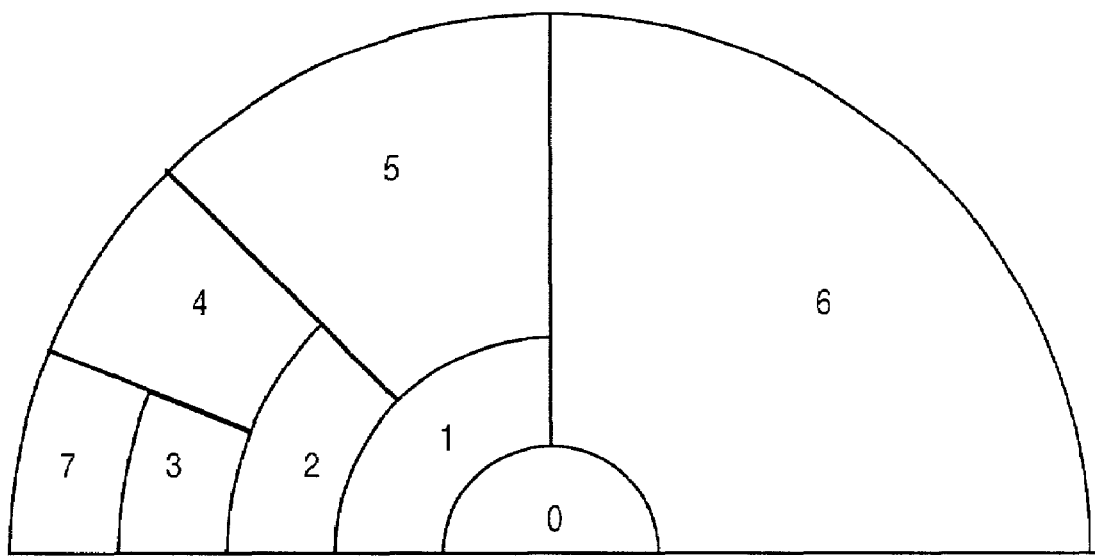
FIG. 9 shows a third embodiment of a plurality of regions to represent the example tree.

FIG. 9 shows a third embodiment of a plurality of regions to represent the example tree. In this embodiment, the region representing node 0 is substantially convex, and the regions representing nodes 1 to 7 are concave.

Radial widths of the regions representing nodes 1, 2, 3 and 7 are approximately equal, and are approximately equal to the radius of an approximate circle defining the region representing node 0. The radial width of the region representing node 4 is approximately equal to the sum of the radial widths of the regions representing nodes 7 and 3. The radial width of the region representing node 5 is approximately equal to the sum of the radial widths of the regions representing nodes 4 and 2. The radial width of the region representing node 6 is approximately equal to the sum of the radial widths of the regions representing nodes 5 and 1.

Angular widths of regions representing sibling nodes are approximately equal. For example, angular widths of the regions representing nodes 1 and 6 are approximately equal, angular widths of the regions representing nodes 2 and 5 are approximately equal, and angular widths of the regions representing nodes 3 and 4 are approximately equal.

An angular width of each region representing a parent node is approximately equal to the sum of angular widths of regions representing its children. For example, the angular width of the region representing node 2 is approximately equal to the sum of the angular widths of the regions representing nodes 3 and 4.

Figure 10:
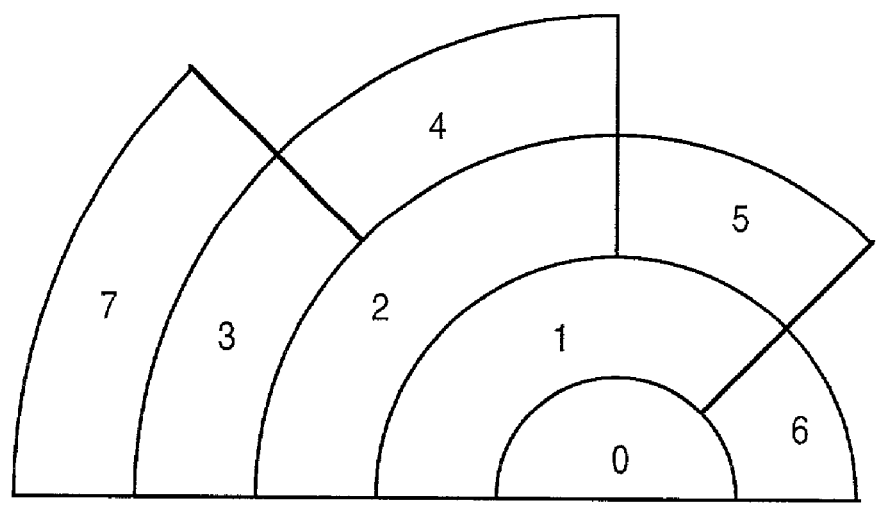
FIG. 10 shows a fourth embodiment of a plurality of regions to represent the example tree.

FIG. 10 shows a fourth embodiment of a plurality of regions to represent the example tree. In this embodiment, the region representing node 0 is substantially convex, and the regions representing nodes 1 to 7 are concave. Radial widths of the regions representing nodes 1 to 7 are approximately equal, and are approximately equal to the radius of an approximate circle defining the region representing node 0.

Angular widths of the regions representing leaf nodes 7, 4, 5 and 6 are approximately equal. An angular width of each region representing a parent node is approximately equal to the sum of angular widths of its children. For example, the angular width of the region representing node 2 is approximately equal to the sum of the angular widths of the regions representing nodes 3 and 4.

Figure 11:
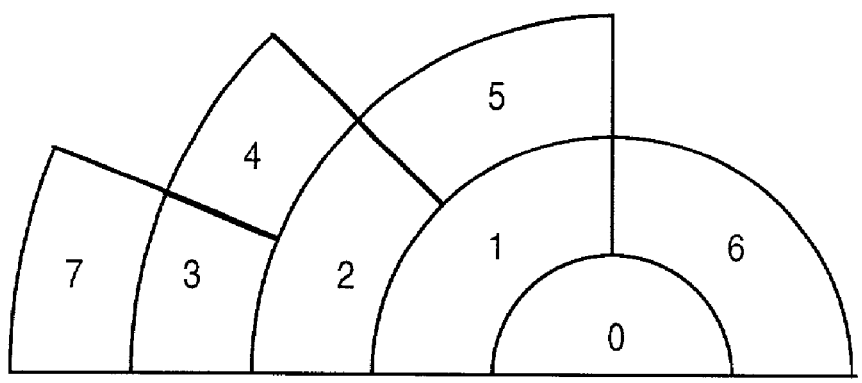
FIG. 11 shows a fifth embodiment of a plurality of regions to represent the example tree.

FIG. 11 shows a fifth embodiment of a plurality of regions to represent the example tree. In this embodiment, the region representing node 0 is substantially convex, and the regions representing nodes 1 to 7 are concave. Radial widths of the regions representing nodes 1 to 7 are approximately equal, and are approximately equal to the radius of an approximate circle defining the region representing node 0.

Angular widths of regions representing sibling nodes are approximately equal. For example, angular widths of the regions representing nodes 1 and 6 are approximately equal, angular widths of the regions representing nodes 2 and 5 are approximately equal, and angular widths of the regions representing nodes 3 and 4 are approximately equal.

An angular width of each region representing a parent node is approximately equal to the sum of angular widths of regions representing its children. For example, the angular width of the region representing node 2 is approximately equal to the sum of the angular widths of the regions representing nodes 3 and 4.

Figure 12:
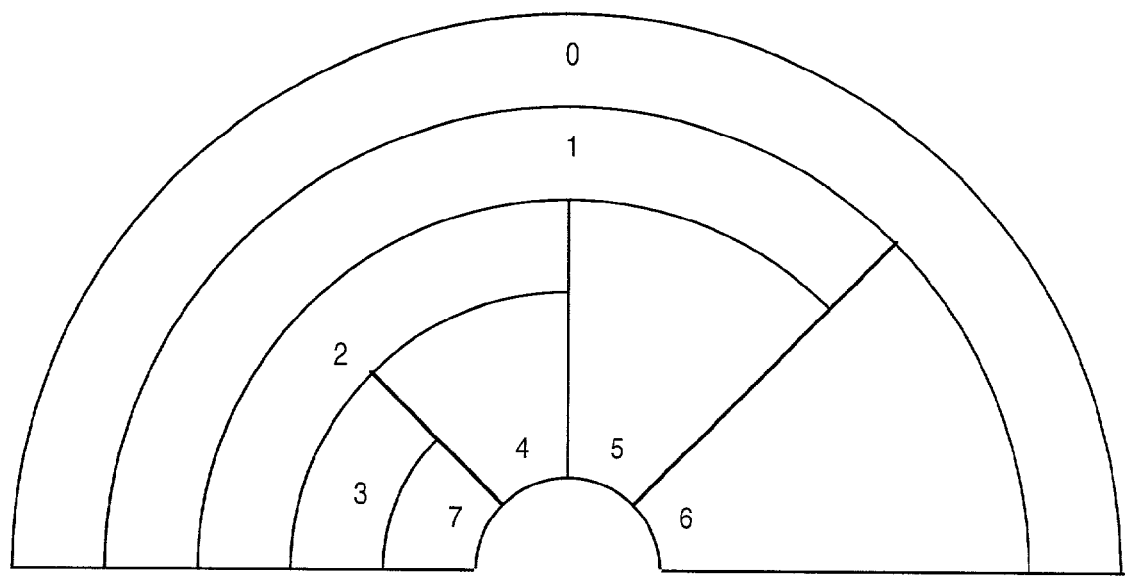
FIG. 12 shows a sixth embodiment of a plurality of regions to represent the example tree.

FIG. 12 shows a sixth embodiment of a plurality of regions to represent the example tree. In this embodiment, the regions representing nodes 0 to 7 are concave. Alternatively, at least one, and optionally all, of the regions representing nodes 7, 4, 5 and 6 may be substantially convex, such as approximate sectors of circles.

Radial widths of the regions representing nodes 0, 1, 2, 3 and 7 are approximately equal. The radial width of the region representing node 4 is approximately equal to the sum of the radial widths of the regions representing nodes 7 and 3. The radial width of the region representing node 5 is approximately equal to the sum of the radial widths of the regions representing nodes 4 and 2. The radial width of the region representing node 6 is approximately equal to the sum of the radial widths of the regions representing nodes 5 and 1.

Angular widths of the regions representing leaf nodes 7, 4, 5 and 6 are approximately equal. The angular width of a region representing a parent node is approximately equal to the sum of angular widths of regions representing its children nodes.

Figure 13:
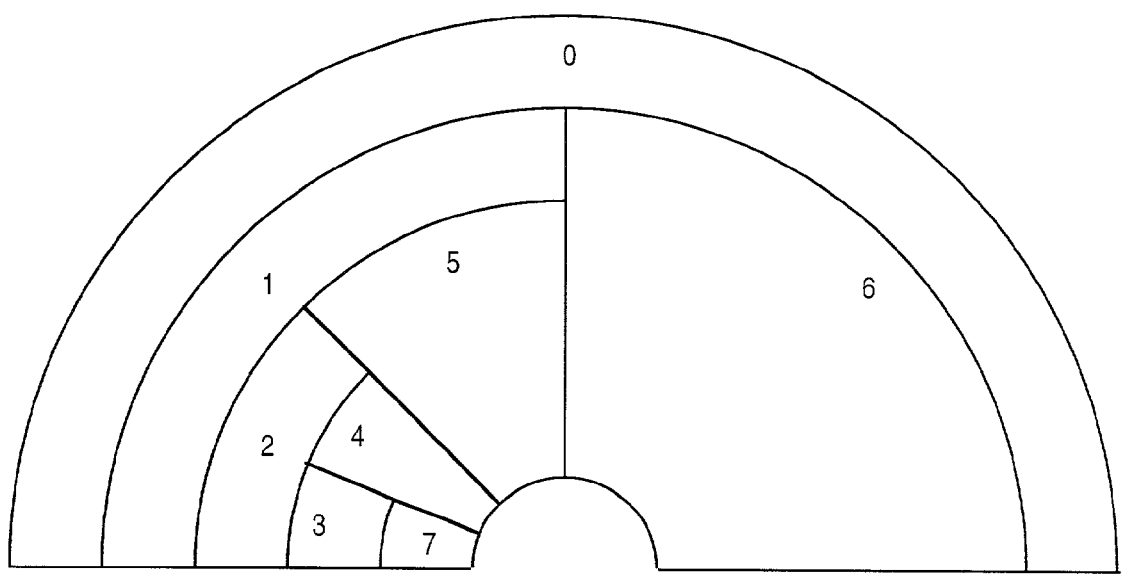
FIG. 13 shows a seventh embodiment of a plurality of regions to represent the example tree.

FIG. 13 shows a seventh embodiment of a plurality of regions which represent the example tree. In this embodiment, the regions representing nodes 0 to 7 are concave. Alternatively, at least one, and optionally all, of the regions representing nodes 7, 4, 5 and 6 may be substantially convex, such as approximate sectors of circles.

Radial widths of the regions representing nodes 0, 1, 2, 3 and 7 are approximately equal. The radial width of the region representing node 4 is approximately equal to the sum of the radial widths of the regions representing nodes 7 and 3. The radial width of the region representing node 5 is approximately equal to the sum of the radial widths of the regions representing nodes 4 and 2. The radial width of the region representing node 6 is approximately equal to the sum of the radial widths of the regions representing nodes 5 and 1.

Angular widths of regions representing sibling nodes are approximately equal. For example, angular widths of the regions representing nodes 1 and 6 are approximately equal, angular widths of the regions representing nodes 2 and 5 are approximately equal, and angular widths of the regions representing nodes 3 and 4 are approximately equal.

An angular width of each region representing a parent node is approximately equal to the sum of angular widths of regions representing its children. For example, the angular width of the region representing node 2 is approximately equal to the sum of the angular widths of the regions representing nodes 3 and 4.

Figure 14:
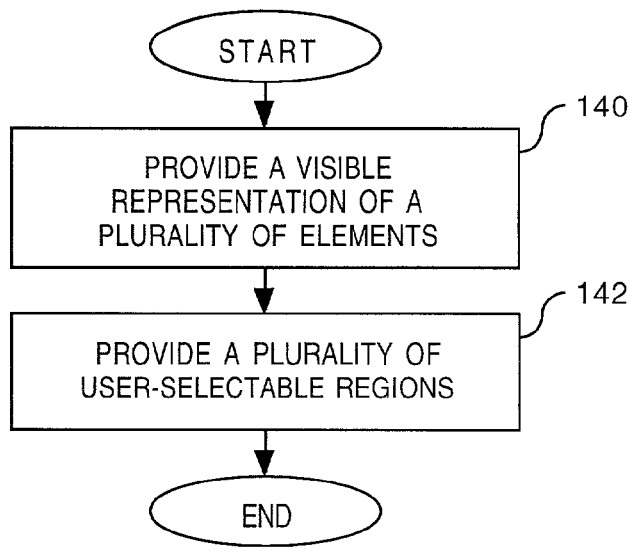
FIG. 14 is a flow chart of an embodiment of a method of providing a user interface.

FIG. 14 is a flow chart of an embodiment of a method of providing a user interface. As indicated by block 140, the method optionally comprises providing a visible representation of a plurality of elements. Preferably, the visible representation comprises a plurality of display regions or shapes to visibly represent the plurality of elements. The visible representation can be generated in accordance with any of the herein-disclosed teachings therefor.

As indicated by block 142, the method optionally comprises providing a plurality of user-selectable regions. Preferably, each user-selectable region corresponds to one of the plurality of elements. Each user-selectable region may be at least partially contained in a respective display region representing a corresponding element. Preferably, each user-selectable region has substantially the same shape, size, and location as its respective display region. Optionally, each user-selectable region has a shape, size, and location in accordance with any of the herein-disclosed teachings for a display region, regardless of whether the region is made visible.

It is noted that in some cases, all of the display regions may have a corresponding user-selectable region. In other cases, only a subset of the display regions may have a corresponding user-selectable region.

The user-selectable regions can be provided in a variety of ways. Of particular interest is use of either a client-side image map or a server-side image map to provide the user-selectable regions. Here, a user-selectable region can be provided using HTML tags to approximate any of the herein-disclosed shapes, including convex shapes such as sectors and concave shapes such as annular sectors. In particular, the polygon area definition in an AREA tag inside a MAP tag can be used to provide a user-selectable region having one of the herein-disclosed shapes.

It is noted that a markup language improvement is contemplated which would provide an annular sector area definition and a sector area definition in an AREA tag inside a MAP tag. For example, a sector of a circle could be definable by an AREA tag having the following form:

<AREA SHAPE="circle_sector"
    COORDS="x,y,x1,y1,x2,y2,x3,y3"
    HREF="URL"> where (x,y) are coordinates of a center point of an arc-defining circle, (x1,y1) are coordinates of a point either on or collinear with a first radial line segment, (x2,y2) are coordinates of a point either on or collinear with a second radial line segment, (x3,y3) are coordinates of a point either on or co-circular with the circular arc, and URL is a computer address such as a uniform resource locator which is linked to in response to a user selection of the region. It is noted that the HREF="URL" portion can replaced by one or more event codes (e.g. onclick, ondblclick, onmousedown, onmousemove, onmouseover, onmouseout, onmouseup) each followed by an associated function.

A sector of a circular annulus could be definable by an AREA tag having the following form:

<AREA SHAPE="annulus_sector"
    COORDS="x,y,x1,y1,x2,y2,x3,y3,x4,y4"
    HREF="URL"> where (x,y) are coordinates of a center point of a first arc-defining circle and a second arc-defining circle, (x1,y1) are coordinates of a point either on or collinear with a first radial line segment, (x2,y2) are coordinates of a point either on or collinear with a second radial line segment, (x3,y3) are coordinates of a point either on or co-circular with the first circular arc, (x4,y4) are coordinates of a point either on or co-circular with the second circular arc, and URL is a computer address such as a uniform resource locator which is linked to in response to a user selection of the region. It is noted that the HREF="URL" portion can replaced by one or more event codes (e.g. onclick, ondblclick, onmousedown, onmousemove, onmouseover, onmouseout, onmouseup) each followed by an associated function.

With this improvement, a user interface creator can more directly implement user-selectable regions having some of the herein-disclosed shapes.

Figure 15:
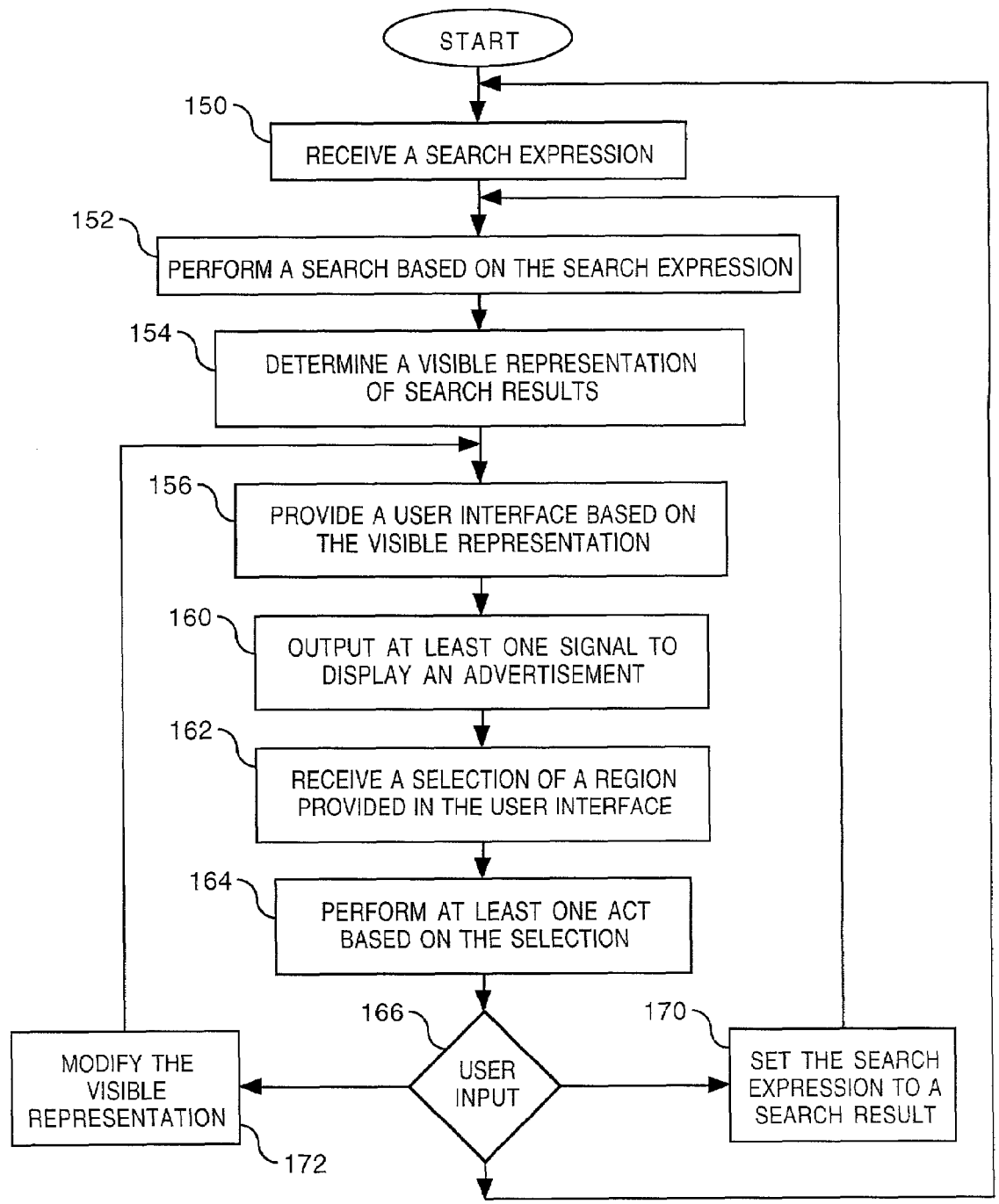
FIG. 15 is a flow chart of an embodiment of a method for use with a user interface.

FIG. 15 is a flow chart of an embodiment of a method for use with a user interface.

As indicated by block 150, the method comprises receiving a search expression. The search expression can be user-entered using an input device such as a keyboard or a voice input device. The search expression may contain one or more words in the form of either a boolean search expression or a natural language search expression, for example. The search expression may include information from a plurality of user-enterable fields to limit the scope of the search. The search expression may include an image or encoded audio.

As indicated by block 152, a search is performed based on the search expression. The search yields search results comprising a subset of one or more elements of a larger set of elements. In general, the search results may comprise any of the herein-mentioned elements. Particular examples of search results include, but are not limited to, a subset of computer-readable files, a subset of computer-readable images, a subset of purchasable items, a subset of individuals, a subset of job positions, a subset of computer addresses, a subset of filenames, and a subset of computer-readable data items from a computer-readable database.

It is preferred that the search results also comprise a first plurality of similarity values and a second plurality of similarity values. Each of the first plurality of similarity values indicates a degree of similarity between the search expression and a corresponding one of the elements of the subset. Each of the second plurality of similarity values indicates a degree of similarity between a corresponding pair of elements of the subset.

As indicated by block 154, a visible representation of the search results is determined. The visible representation may be determined based upon any of the herein-disclosed teachings. Preferably, the visible representation comprises a plurality of regions to represent a plurality of elements obtained from the search. Optionally, the visible representation comprises a region to represent the search expression. In this case, it is preferred that the region representing the search expression correspond to the first element described with reference to FIGS. 3 and 4.

As another option, each region can have either an area or a dimension monotonically related to the similarity value of its corresponding element with the search expression. For this purpose, either the first plurality of similarity values themselves or a monotonic function thereof may be used as the herein-disclosed weight values for determining parameters of the regions. A desirability of this option is that a second element, more similar to the search expression than a third element, is visibly represented by a second region having a greater area than a third region representing the third element.

As yet another option, each region can have a visible display property based on the similarity value of its corresponding element with the search expression. For example, each region may be displayed with a respective color dependent upon a corresponding similarity value.

As indicated by block 156, a user interface is provided based on the visible representation. Preferably, the user interface comprises a plurality of user-viewable, user-selectable regions corresponding to the plurality of elements obtained from the search, and optionally, the search expression. Optionally, the display region corresponding to the search expression may not be user-selectable.

As indicated by block 160, the method optionally comprises outputting at least one signal to display a user-viewable advertisement. The at least one signal to display the user-viewable advertisement may encode an image and/or graphics in the advertisement, or may provide a link to an image and/or graphics in the advertisement. The user-viewable advertisement may be viewable by the user while at least one of the user-selectable regions is accessible by the user. Here, for example, the user-viewable advertisement and the user interface may be contained within a single Web page.

As indicated by block 162, a selection of a region provided in the user interface is received. The selection of the region is performed using an input device such as a pointing device, a keyboard, or a voice input device. Examples of pointing devices include, but are not limited to, a mouse, a touchpad, a trackball, a joystick, a pointing stick, and a touchscreen. The selection is detected in response to a user-initiated event for the region. Examples of the user-initiated event include, but are not limited to, an on-click event, a double-click event, a mouse-move event, a mouse-over event, a mouse-out event, a mouse-up event, and a key depression event.

As indicated by block 164, at least one act is performed based on the selection. The at least one act may include, but is not limited to, any of the following examples. If the plurality of elements include a plurality of purchasable items, and the selection is of a region associated with a particular purchasable item, the at least one act may include: providing information for the particular purchasable item, and/or performing a transaction for the particular purchasable item. If the plurality of elements include a plurality of computer addresses, and the selection is of a region associated with a particular computer address, the at least one act may include linking to the particular computer address. If the plurality of elements include a plurality of computer-readable files, and the selection is of a region associated with a particular computer-readable file, the at least one act may include opening the computer-readable file. If the plurality of elements include a plurality of records from a database, and the selection is of a region associated with a particular record, the at least one act may include any combination of retrieving, processing, displaying, modifying, or deleting the record from the database. As either an alternative or in addition to the acts in the aforementioned examples, the at least one act may include outputting at least one signal to display a user-viewable advertisement. The at least one signal to display the user-viewable advertisement may encode an image and/or graphics in the advertisement, or may provide a link to an image and/or graphics in the advertisement.

As indicated by block 166, subsequent acts are performed based upon a user input. If a first user input is received, flow of the method is directed back to block 150 to receive another search expression. Thereafter, a subsequent search is performed, a subsequent visible representation is determined, and a subsequent user interface is provided.

If a second user input is received, the search expression is set to a search result, as indicated by block 170. In other words, a portion or all of the content from one of the elements obtained from the search becomes the search expression. Thereafter, flow is directed back to block 152 wherein a subsequent search is performed using the new search expression, a subsequent visible representation is determined, and a subsequent user interface is provided.

If a third user input is received, the visible representation is modified, as indicated by block 172. Thereafter, flow is directed back to block 156 wherein a user interface is provided based on the modified visible representation.

Figure 16:
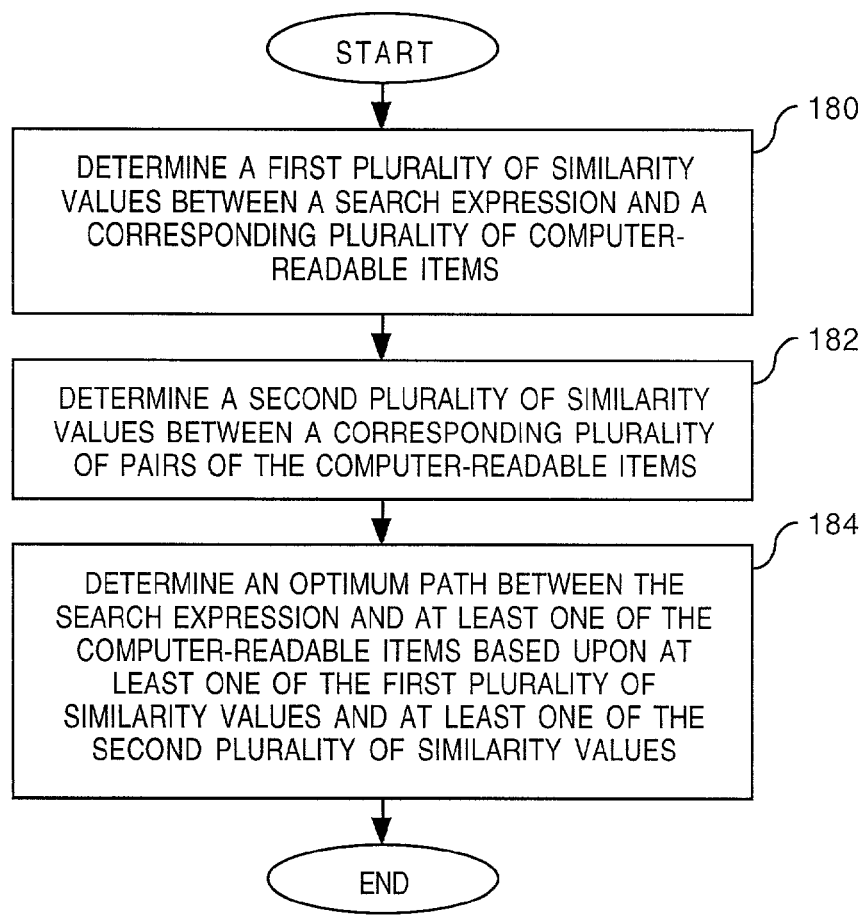
FIG. 16 is a flow chart of an embodiment of a method of determining paths between a search expression and a plurality of computer-readable items.

FIG. 16 is a flow chart of an embodiment of a method of determining paths between a search expression and a plurality of computer-readable items. Typically, each computer-readable item comprises at least a portion of a computer-readable file. For example, each computer-readable item can comprise at least a portion of, and optionally an entire portion of, a respective one of a plurality of computer-readable files. As another example, each computer-readable item can comprise a portion of a single computer-readable file such as a database file. It is noted that the search expression itself may comprise at least a portion of, and optionally an entire portion of, a computer-readable item.

As indicated by block 180, the method comprises determining a first plurality of similarity values between a search expression and a corresponding plurality of computer-readable items. Optionally, only a subset of the computer-readable items are considered in subsequent acts in the method. Here, for example, only N computer-readable items most similar with the search expression are considered further, where N is an integer. As another example, only the computer-readable items whose first similarity values are beyond a threshold are considered further. In this case, the number of computer-readable items in the subset may vary from search to search.

As used herein, the term "beyond" can refer to a state of being either greater than, greater than or equal to, less than, or less than or equal to.

As indicated by block 182, the method comprises determining a second plurality of similarity values between a corresponding plurality of pairs of the computer-readable items. Preferably, the second plurality of similarity values are determined only between corresponding pairs of computer-readable items in the aforementioned subset.

As indicated by block 184, the method comprises determining an optimum path between the search expression and at least one of the computer-readable items based upon at least one of the first plurality of similarity values and at least one of the second plurality of similarity values. Preferably, a corresponding optimum path is determined between the search expression and each of the computer-readable items in the subset.

The optimum path between the search expression and a computer-readable item has an optimum function value of similarity values between the search expression and the computer-readable item. Examples of the function whose optimum value dictates the optimum path include, but are not limited to, a sum of similarity values between the search expression and the computer-readable item, and a product of similarity values between the search expression and the computer-readable item. To determine an optimum product of similarity values, an additive optimum path algorithm may be performed on a logarithm of the similarity values.

Figure 17:
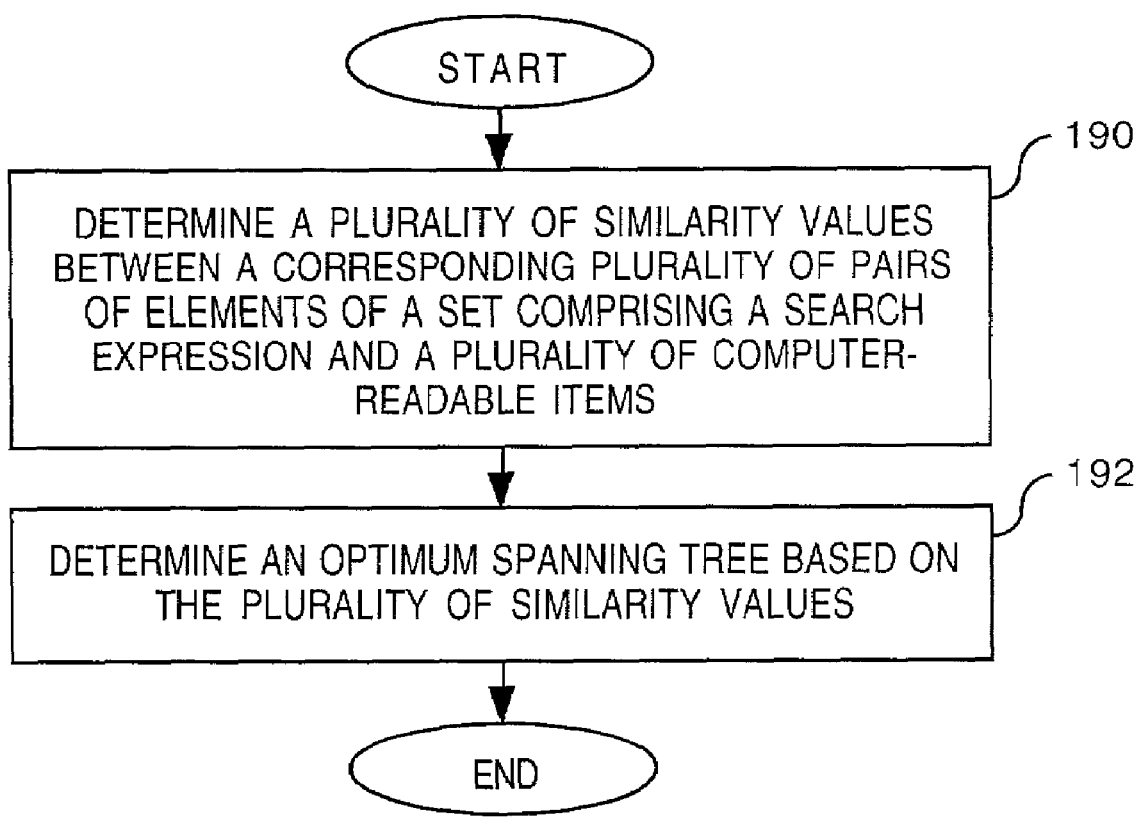
FIG. 17 is a flow chart of an embodiment of a method of determining a tree which relates a search expression with a plurality of computer-readable items.

The paths between the search expression and the computer-readable items may be displayed using any of the herein-disclosed visible representation methods. Alternatively, one or more of the paths may be displayed or visibly represented otherwise FIG. 17 is a flow chart of an embodiment of a method of determining a tree which relates a search expression with a plurality of computer-readable items.

As indicated by block 190, the method comprises determining a plurality of similarity values between a corresponding plurality of pairs of elements of a set comprising the search expression and the plurality of computer-readable items. The plurality of similarity values may be determined using the teachings described with reference to blocks 180 and 182 in FIG. 16.

As indicated by block 192, the method comprises determining an optimum spanning tree based on the plurality of similarity values. Optionally, only a subset of the computer-readable items are considered for inclusion in the optimum spanning tree. Here, for example, only N computer-readable items which are most similar to the search expression are considered, where N is an integer. As another example, the optimum spanning tree only considers the computer-readable items whose similarity values with the search expression are beyond a threshold.

The optimum spanning tree has an optimum function value of similarity values. Examples of the function whose optimum value dictates the optimum spanning tree include, but are not limited to, a sum of similarity values, and a product of similarity values. To determine an optimum product of similarity values, an additive optimum spanning tree algorithm may be performed on a logarithm of the similarity values.

The optimum spanning tree may be displayed using any of the herein-disclosed visible representation methods. In this case, the root node of the optimum spanning tree may be presumed to be a node representing the search expression. As an alternative to the herein-disclosed visible representations, the optimum spanning tree may be displayed or visibly represented otherwise.

An apparatus for performing an embodiment of the herein-disclosed methods and examples may comprise one or more programmed computers. Each programmed computer may provide a particular functionality implemented using hardware and/or software and/or firmware.

Preferably, a programmed computer includes a computer memory encoded with executable instructions representing a computer program. A processor is responsive to the computer memory to perform a series of specifically identified operations dictated by the computer program. In this way, the computer program can cause the computer to act in a particular fashion.

Examples of the processor include, but are not limited to, a general purpose microprocessor, an application-specific integrated circuit (which may be either standard or custom), one or more discrete logic elements, a digital signal processor, an analog signal processor, one or more circuits, or any combination thereof. It is noted that the processor may be embodied by either a single processing unit or a plurality of processing units. For example, the processor may be embodied by either a single, central processing unit or a plurality of distributed processing units.

Examples of the computer memory include, but are not limited to, an electronic memory, a magnetic memory, an optical memory, and a magneto-optical memory. Examples of an electronic memory include, but are not limited to, a programmable electronic memory and a read-only, hard-wired electronic memory. Examples of a magnetic memory include, but are not limited to, a magnetic disk and a magnetic tape. The magnetic disk may be embodied by a magnetic floppy diskette or a magnetic hard drive, for example. Examples of an optical memory include, but are not limited to, an optical disk. The optical disk may be embodied by a compact disk or a DVD, for example. Regardless of its form, the computer memory may be either read-only, once-writable, or rewritable.

In general, the processor may be responsive to any data structures, computer programs, and signals encoded on a computer-readable medium to perform an embodiment of any of the herein-disclosed methods and examples. Examples of the computer-readable medium include, but are not limited to, computer-readable storage media and computer-readable communication media. Examples of computer-readable storage media are described with reference to the computer memory. Examples of computer-readable communication media are described with reference to block 22 in FIG. 1.

The computer is coupled to a display to display the visible representations described herein and other visible information to an end user. Examples of the display include any of the herein-disclosed display devices.

The computer receives user input from one or more input devices. Examples of the one or more input devices include any of the herein-disclosed input devices. The computer processes the user input and/or communicates at least one signal based upon the user input. The display and the one or more input devices facilitate user interaction with the computer.

Embodiments of the herein-disclosed methods and examples can be performed using either a single computer or a plurality of computers. A plurality of computers may cooperate in a client-server fashion, for example, wherein a server computer outputs at least one signal to cause a client computer to display a visible representation and/or to provide a user interface.

To illustrate practical applications of the herein-disclosed teachings, various examples of fictitious elements are considered to be represented by the regions in FIG. 7. Alternatively, the fictitious elements can be represented by any of the alternatives shown in FIGS. 8 to 13, or by other alternatives within the scope of this disclosure.

EXAMPLE 1

Patent Claims

In this example, nodes 0 to 7 represent eight hypothetical claims in a hypothetical patent. Node 0 represents an independent claim; nodes 1 to 7 represent dependent claims. The dependency of the hypothetical claims is indicated by FIG. 6.

In response to a user-initiated event associated with a region, the claim represented by the region is displayed. For example, the claim may be displayed when the cursor is located in the associated region, or when the user clicks on the region. Preferably, the claim and the visible representation are simultaneously viewable. In response to a user-initiated event associated with another region, another represented claim is displayed.

As an alternative to displaying the regions with substantially the same area, each region may be displayed with an associated area monotonically related with a property of its represented claim. For example, each region may be displayed with an associated area monotonically related with a number of words in its represented claim.

EXAMPLE 2

Organization Chart

In this example, nodes 0 to 7 represent eight hypothetical individuals in a hypothetical organization. Node 0 represents a first individual at the top of either the organization or a portion of the organization. Nodes 1 and 6 represent second and third individuals, respectively, who report to the first individual. Nodes 2 and 5 represent fourth and fifth individuals, respectively, who report to the second individual. Nodes 3 and 4 represent sixth and seventh individuals, respectively, who report to the fourth individual. Node 7 represents an eighth individual who reports to the sixth individual.

In response to a user-initiated event associated with a region, information associated with the individual represented by the region is displayed. Examples of the information include a name, an address, a telephone number, a title, a department, and an electronic mail address. The information may be displayed when the cursor is located in the associated region, or when the user clicks on the region. Preferably, the information and the visible representation are simultaneously viewable. When the user initiates an event at another region, information for another individual is displayed. Preferably, this information is displayed in place of the previously-displayed information.

EXAMPLE 3

Hierarchy of Computer Directories and Files

In this example, node 0 represents a logical disk drive, such as "c:". Node 1 represents a first directory in the logical disk drive. Node 6 represents a file accessible at "c:". Node 2 represents a first subdirectory of the first directory. Node 5 represents a file within the first directory. Node 3 represents a second subdirectory of the first subdirectory. Node 4 represents a file within the first subdirectory. Node 7 represents a file within the second subdirectory.

In the context of this disclosure, the terms "folder" and "subfolder" are considered to be synonymous with the terms "directory" and "subdirectory".

In response to a user-initiated event associated with a region representing a file, the file is opened and/or an application program is executed. The user-initiated event may comprise, for example, a single click or a double click at a region representing a file.

In response to a user-initiated event associated with a region representing a directory or a subdirectory, a new visible representation is determined and displayed. The new visible representation represents the selected directory or subdirectory, and its descendant subdirectories and/or files. For example, if the user single clicks or double clicks at the region representing node 2, a new visible representation may be determined and displayed for nodes 2, 3, 4 and 7.

EXAMPLE 4

Messages

In this example, nodes 0 to 7 represent hypothetical messages in a hypothetical internet discussion group, such as USENET, or another on-line forum. Node 0 represents a base message posted to the discussion group. Nodes 1 to 7 represent seven reply messages posted either directly or indirectly from the base message. Node 1 represents a first reply message to the base message. Node 2 represents a second reply message to the first reply message. Node 3 represents a third reply message to the second reply message. Node 4 represents a fourth reply message to the second reply message. Node 5 represents a fifth reply message to the first reply message. Node 6 represents a sixth reply message to the base message. Node 7 represents a seventh reply message to the third reply message.

In response to a user-initiated event associated with a region, the message represented by the region is displayed. The user-initiated event may comprise, for example, a single click or a double click at the region, or a cursor within the region. Preferably, the message and the visible representation are simultaneously viewable.

Further in response to the user-initiated event associated with the region, a visible display property of the region may be modified. Examples of the visible display property include, but are not limited to, an interior color of the region, an interior gray scale of the region, an interior fill pattern for the region, a color bordering the region, an image within the region, and text within the region. Modifying the visible display property is desirable to indicate that the message has been selected by the user.

Unselected regions may be displayed using a first display property. Some or all previously-selected regions may be displayed using a second display property.

Optionally, at least one previously-selected region is displayed using a third display property responsive to a user input. The user input indicates a user's dislike of a message represented by a region. For example, the user may regard the message as a "flame" using Internet parlance. By seeing the third display property, the user may wish to avoid reading subsequent messages which descend from the flame message. Optionally, all descendant messages from the aforementioned message may also be displayed using the third display property.

Either as an alternative to or in addition to displaying the region using the third display property, a new visible representation may be determined and displayed in response to the user input. The new visible representation omits the descendants of the message, and optionally omits the message also. For example, if the user input indicates dislike of the message represented by node 2, a new visible representation may be determined and displayed for nodes 0, 1, 5, 6 and optionally 2.

In response to a user-initiated event associated with another region, another represented message is displayed. Preferably, this message is displayed in place of the previously-displayed message.

As an alternative to displaying the regions with substantially the same area, each region may be displayed with an associated area monotonically related with a property of its represented message. For example, each region may be displayed with an associated area monotonically related with either a number of words in its represented message, or a number of bytes in its represented message.

The user interface comprising the visible representation of the messages may be provided by a newsgroup site, a discussion site, or another site, for example. The user interface may be presented to an end user using a computer with a browser or an alternative client program. The site may also provide one or more visible advertisements to the end user. Alternatively, the user interface comprising the visible representation of the messages may be provided by a news reader computer program executed by the end user's computer.

EXAMPLE 5

Electronic Commerce

In this example, nodes 1 to 7 represent seven purchasable items. Node 0 may represent a search expression entered by a user to find purchasable items of interest. The seven purchasable items may be identified as a result of performing a search based on the search expression.

Optimum paths between the seven purchasable items and the search expression may be determined based upon the teachings given with reference to FIG. 16. In this case, the computer-readable items described with reference to FIG. 16 may comprise computer-readable descriptions of the purchasable items. The visible representation graphically indicates the optimum paths. It is noted, however, that alternative methods of organizing the seven purchasable items may also be used to produce the visible representation.

In response to a user-initiated event associated with a region, at least one act is performed. The at least one act may include any combination of: (i) displaying information for the purchasable item represented by the region; and (ii) performing, initiating, and/or assisting in performing a transaction for the purchasable item. Examples of the displayed information include, but are not limited to, a description of the purchasable item, an image of the purchasable item, and a price of the purchasable item. Preferably, the information and the visible representation are simultaneously viewable. An example of assisting in performing a transaction includes, but is not limited to, linking to a computer address at which the purchasable item may be purchased.

The user-initiated event may comprise, for example, a single click or a double click at the region, or a cursor within the region. Preferably, a first user-initiated event initiates the display of information for the purchasable item, and a second user-initiated event initiates a transaction for the purchasable item. Optionally, a plurality of the purchasable items can be user-selected before initiating a transaction therefor.

Optionally, each region for nodes 1 to 7 is displayed with a corresponding visible display property based on a property of its represented purchasable item. Examples of the property include, but are not limited to, price of the purchasable item, weight of the purchasable item, and similarity of the purchasable item to the search expression. The visible display property of a region may be modified if its represented purchasable item has been selected for purchase.

For purposes of illustration and example, the seven purchasable items are considered to comprise seven hypothetical books. As can be appreciated, however, the following teachings broadly extend to other purchasable items.

The similarity values between pairs of books may be predetermined prior to the search, or determined after or during the search. The similarity values may be determined based upon the full text of the books. In this case, it is preferred that the full text of the books not be made accessible to a potential purchaser prior to his/her purchase. Alternatively, the similarity values may be determined based on either a set of keywords or an abstract of the book. The similarity values between the search expression and the books may be based upon the full text of the books, abstracts of the books, or keywords for the books.

Preferably, each pair of radially-adjacent regions represents a pair of books more similar to each other than the least similar of the pair of books is with the search expression. For example, with reference to FIGS. 6 and 7, the book represented by node 7 is more similar to the book represented by node 3 than to the search expression. Therefore, if the user is disinterested in the book represented by node 3 after viewing information therefor, he/she may choose to disregard the book represented by node 7.

As an alternative to displaying the regions with substantially the same area, each region may be displayed with an associated area monotonically related with a property of its represented item. For example, each region may be displayed with an associated area monotonically related with either the similarity value of its represented item with the search expression, the price of the represented item, or the weight of the represented item.

The user interface comprising the visible representation of the purchasable items may be provided by an electronic commerce site or another site, for example. The user interface may be presented to an end user using a computer with a browser or an alternative client program. The site may also provide one or more visible advertisements to the end user.

EXAMPLE 6

Electronic Commerce

In this example, node 0 represents a category of items of interest to the user. Nodes 1 to 7 represent seven purchasable items based on the category.

For purposes of illustration and example, consider node 0 representing a user-selected category of portable computers. Consider node 6 representing a palmtop computer packaged with a complete set of accessories, and node 1 representing a notebook computer. Consider nodes 2, 3, 4, 5 and 7 representing accessories for use with the notebook computer.

Node 2 may represent a portable printer usable with the notebook computer. Node 4 may represent a carrying case capable of carrying both the notebook computer and the portable printer. Node 5 may represent a carrying case capable of carrying the notebook computer but not with the portable printer. Node 3 may represent a desk capable of supporting the notebook computer and the portable printer. Node 7 may represent a chair capable of use with the desk.

Each pair of radially-adjacent regions represents related purchasable items. Preferably, each pair of radially-adjacent regions represents a pair of items more related to each other than the least related of the items is with the category. For example, with reference to FIGS. 6 and 7, the chair represented by node 7 is more related to the desk represented by node 3 than to the category of portable computers. Therefore, if the user is disinterested in the desk represented by node 3, he/she may choose to disregard the chair represented by node 7.

Further, each sequence of radially-adjacent regions represents a potential group of items to be purchased together. For example, a user may choose to purchase the notebook computer, the portable printer, and the carrying case capable of carrying both the notebook computer and portable printer represented by the regions for nodes 1, 2 and 4.

In response to a user-initiated event associated with a region, at least one act is performed. The at least one act may include any combination of: (i) displaying information for the purchasable item represented by the region; and (ii) performing, initiating, and/or assisting in performing a transaction for the purchasable item. Examples of the displayed information include, but are not limited to, a description of the purchasable item, an image of the purchasable item, and a price of the purchasable item. Preferably, the information and the visible representation are simultaneously viewable. An example of assisting in performing a transaction includes, but is not limited to, linking to a computer address at which the purchasable item may be purchased.

The user-initiated event may comprise, for example, a single click or a double click at the region, or a cursor within the region. Preferably, a first user-initiated event initiates the display of information for the purchasable item, and a second user-initiated event initiates a transaction for the purchasable item. Optionally, a plurality of the purchasable items can be user-selected before initiating a transaction therefor.

Optionally, each region for nodes 1 to 7 is displayed with a corresponding visible display property based on a property of its represented purchasable item. Examples of the property include, but are not limited to, price of the purchasable item, weight of the purchasable item, and similarity of the purchasable item to the category. The visible display property of a region may be modified if its represented purchasable item has been selected for purchase.

As an alternative to displaying the regions with substantially the same area, each region may be displayed with an associated area monotonically related with a property of its represented item. For example, each region may be displayed with an associated area monotonically related with either the similarity value of its represented item with the search expression, the price of the represented item, or the weight of the represented item.

The user interface comprising the visible representation of the purchasable items may be provided by an electronic commerce site or another site, for example. The user interface may be presented to an end user using a computer with a browser or an alternative client program. The site may also provide one or more visible advertisements to the end user.

EXAMPLE 7

Search Results

In this example, nodes 1 to 7 represent seven computer-readable files, such as Web pages, on a computer network such as an internet. Node 0 represents a search expression entered by a user to find computer-readable files (e.g. Web pages) of interest. The seven computer-readable files are identified as a result of performing a search based on the search expression.

Optimum paths between the seven computer-readable files and the search expression may be determined based upon the teachings given with reference to FIG. 16. The similarity values between pairs of computer-readable files may be predetermined prior to the search, or determined after or during the search. The visible representation graphically indicates the optimum paths. It is noted, however, that alternative methods of organizing the seven computer-readable files may also be used to produce the visible representation.

In response to a user-initiated event associated with a region, at least one act is performed. The at least one act may include any combination of: (i) displaying a computer address for the computer-readable file represented by the region; (ii) displaying information for the computer-readable file represented by the region; and (iii) linking to the computer-readable file. Examples of the computer address include, but are not limited to, a uniform resource locator and an internet protocol address. Preferably, the computer address and the visible representation are simultaneously viewable. Examples of the displayed information include, but are not limited to, a description of the computer-readable file, and a portion of the computer-readable file. Preferably, the information and the visible representation are simultaneously viewable.

The user-initiated event may comprise, for example, a single click or a double click at the region, or a cursor within the region. Preferably, a first user-initiated event initiates the display of the computer address and the description of the computer-readable file, and a second user-initiated event initiates linking to the computer-readable file.

Optionally, each region for nodes 1 to 7 is displayed with a corresponding visible display property based on a property of its represented computer-readable file. Examples of the property include, but are not limited to, the size of the computer-readable file, and the similarity of the computer-readable file to the search expression. The visible display property of a region may be modified after linking to its represented computer-readable file.

Preferably, each pair of radially-adjacent regions represents a pair of computer-readable files more similar to each other than the least similar of the pair of computer-readable files with the search expression. For example, with reference to FIGS. 6 and 7, the computer-readable file represented by node 7 is more similar to the computer-readable file represented by node 3 than to the search expression. Therefore, if the user is disinterested in the computer-readable file represented by node 3 after viewing information therefor, he/she may choose to disregard the computer-readable file represented by node 7.

As an alternative to displaying the regions with substantially the same area, each region may be displayed with an associated area monotonically related with a property of its represented computer-readable file. For example, each region may be displayed with an associated area monotonically related with either the similarity value of its represented computer-readable file with the search expression, or the size of the computer-readable file.

The user interface comprising the visible representation of the computer-readable files may be provided by a site which provides a search capability, such as an internet portal. The user interface may be presented to an end user using a computer with a browser or an alternative client program. The site may also provide one or more visible advertisements to the end user.

EXAMPLE 8

Directory

In this example, nodes 0, 1, 2 and 3 represent four information categories, and nodes 4, 5, 6 and 7 represent four information sources. Node 1 represents a subcategory within the category represented by node 0. Node 2 represents a subcategory within the category represented by node 1. Node 3 represents a subcategory within the category represented by node 2. Node 4 represents an information source within the category represented by node 2. Node 5 represents an information source within the category represented by node 1. Node 6 represents an information source within the category represented by node 0. Node 7 represents an information source within the category represented by node 3. Examples of the information sources include, but are not limited to, computer-readable files, such as Web pages, or other computer-readable items.

In response to a user-initiated event associated with a region representing an information source, at least one act is performed. The at least one act may include any combination of: (i) displaying a computer address for the information source represented by the region; (ii) displaying information associated with the information source represented by the region; and (iii) linking to the information source. Examples of the computer address include, but are not limited to, a uniform resource locator and an internet protocol address. Preferably, the computer address and the visible representation are simultaneously viewable. Examples of the displayed information include, but are not limited to, a description of the information source, and a portion of the content of the information source. Preferably, the information and the visible representation are simultaneously viewable.

The user-initiated event may comprise, for example, a single click or a double click at the region, or a cursor within the region. Preferably, a first user-initiated event initiates the display of the computer address and the description of the computer-readable file, and a second user-initiated event initiates linking to the computer-readable file.

In response to a user-initiated event associated with a region representing a subcategory, a new visible representation is determined and displayed. The new visible representation represents the selected subcategory, and its descendant subcategories and/or information sources. For example, if the user selects the region representing node 2, a new visible representation may be determined and displayed for nodes 2, 3, 4 and 7.

The user interface comprising the visible representation of the information sources and categories may be provided by a site which provides a categorical directory, such as an internet portal. The user interface may be presented to an end user using a computer with a browser or an alternative client program. The site may also provide one or more visible advertisements to the end user.

EXAMPLE 9

Hyperlinks

In this example, nodes 0 to 7 represent eight pages of a hypothetical computer site, such as a Web site. The visible representation in FIG. 7 visibly represents a hierarchy of the eight pages. Each pair of radially-adjacent regions represents a hyperlink between two pages.

An opening page, such as a home page, of the site is represented by node 0. The opening page is linked with a page represented by node 1 and a page represented by node 6. The page represented by node 1 is linked with a page represented by node 2 and a page represented by node 5. The page represented by node 2 is linked with a page represented by node 3 and a page represented by node 4. The page represented by node 3 is linked with a page represented by node 7.

Each page is identified by a unique computer address, such as a URL. Each hyperlink within a page links to a target page using the computer address of the target page.

In response to a user-initiated event associated with a region, acts of linking to the computer address represented by the region, and displaying the page represented by the region are performed. The user-initiated event may comprise, for example, a single click or a double click at the region, or a cursor within the region. The page and the visible representation may be simultaneously viewable.

Further in response to the user-initiated event associated with the region, a visible display property of the region may be modified. Examples of the visible display property include, but are not limited to, an interior color of the region, an interior gray scale of the region, an interior fill pattern for the region, a color bordering the region, an image within the region, and text within the region. Modifying the visible display property is desirable to indicate that the page has been selected by the user.

Unselected regions may be displayed using a first display property. Some or all previously-selected regions may be displayed using a second display property.

In response to a first user input, a reduced visible representation may be determined and displayed. The reduced visible representation omits descendant pages of a user-selected page. For example, if the user input indicates that a reduced visible representation is to be determined based on a selection of the page represented by node 2, a reduced visible representation is determined and displayed for the pages associated with nodes 0, 1, 5, 6 and 2.

In response to a second user input, an expanded visible representation may be determined and displayed. The expanded visible representation includes descendant pages of a user-selected page. For example, if the user input indicates that an expanded visible representation is to be determined based on a selection of the page represented by node 2, an expanded visible representation returns the regions representing pages associated with nodes 3, 7 and 4.

As an alternative to displaying the regions with substantially the same area, each region may be displayed with an associated area monotonically related with a property of its represented page. For example, each region may be displayed with an associated area monotonically related with the size of a file to produce the page.

The user interface comprising the visible representation of the hyperlinks may be provided by the computer site itself. Alternatively, the user interface may be provided by another computer site. In these cases, the user interface may be presented to an end user using a computer with a browser or an alternative client program. The site may also provide one or more visible advertisements to the end user.

Alternatively, the user interface may be provided by the end user's computer. In this case, for example, the user interface can be provided within a computer program for creating a site, within a browser program, or within another computer program.

In general, the teachings in this example can be extended to consider eight pages which may not be necessarily associated with the same computer site. The teachings can be modified to consider portions of a single page, wherein each region represents a corresponding portion of a page, and radial adjacency of two regions represents a hyperlink within one portion of the page to link to another portion of the page. Further, radial adjacency of two regions may suggest either: (i) a link directed from a page or a page portion represented by an inner region to a page or a page portion represented by an outer region; (ii) a link directed from a page or a page portion represented by an outer region to a page or a page portion represented by an inner region;

(iii) links in both of the aforementioned directions; or (iv) a link directed in at least one of the aforementioned directions.

It is noted that the present disclosure contemplates independent use of any one of the herein-disclosed methods and examples of element organization, visible representation and input interfaces. For example, any of the herein-disclosed methods and examples of element organization may be combined with alternative visible representations and/or alternative input interfaces. As a further example, any of the herein-disclosed methods and examples of visible representation may be combined with an alternative element organization and/or alternative input interfaces. As a still further example, any of the herein-disclosed input interfaces may be combined with an alternative element organization and/or alternative visible representations.

It is also noted that the present disclosure contemplates methods, articles, apparatus, and examples which include an act of providing a link to a computer site which performs an embodiment of any of the herein-disclosed methods and examples. The present disclosure also contemplates methods, articles, apparatus, and examples which include an act of providing a user-viewable advertisement for a computer site which performs an embodiment of any of the herein-disclosed methods and examples. The user-viewable advertisement may be communicated to the end user from either an advertisement provider or the computer site. The present disclosure further contemplates methods, articles, apparatus, and examples which include an act of receiving a hit from an end user who has hyperlinked from a computer site which performs an embodiment of any of the herein-disclosed methods and examples. Each of the aforementioned computer sites may include an internet site, a Web site, or another site accessible via a computer network.

It will be apparent to those skilled in the art that the disclosed inventions may be modified in numerous ways and may assume many embodiments other than the preferred forms specifically set out and described herein.

Accordingly, it is intended by the appended claims to cover all modifications which fall within the true spirit and scope of the present invention.

What is claimed is:

1. A method comprising:
   receiving a search expression entered by a user, the search expression comprising one or more words;
   performing a search to find one or more books of interest to the user based on a similarity between the search expression and a corresponding full text of each of a plurality of books that are purchasable via an electronic commerce computer site;
   performing a transaction in which the user uses the electronic commerce computer site to purchase a book user-selected from the one or more books; and
   making the full text of the book inaccessible to the user via the electronic commerce computer site prior to said performing the transaction.

2. A method comprising:
   receiving a search expression entered by a user, the search expression comprising one or more words;
   performing a search to find one or more books of interest to the user based on a similarity between the search expression and a corresponding full text of each of a plurality of books that are purchasable via an electronic commerce computer site;
   providing, to the user, information associated with a book user-selected from the one or more books after said performing the search, wherein the information comprises an image of the book and a price of the book, and wherein the information is absent the full text of the book;
   making the full text of the book inaccessible to the user via the electronic commerce computer site; and
   performing a transaction in which the user uses the electronic commerce computer site to purchase the book.

3. A method comprising:
   receiving a search expression entered by a user, the search expression comprising one or more words;
   performing a search to find one or more purchasable books of interest to the user based on a similarity between the search expression and a corresponding full text of each of a plurality of purchasable books;
   outputting at least one signal from a computer site to provide a visible representation of the one or more purchasable books to the user; and
   making the corresponding full text of each of the one or more purchasable books inaccessible to the user via the computer site.

4. The method of claim 3 wherein the visible representation comprises one or more concave regions to visibly represent the one or more purchasable books.

5. A method comprising:
   receiving a search expression entered by a user, the search expression comprising one or more words;
   performing a search to find one or more books of interest to the user based on a similarity between the search expression and a corresponding full text of each of a plurality of books that are purchasable via an electronic commerce computer site;
   outputting at least one signal from the electronic commerce computer site to provide a user interface comprising a visible representation of the one or more books to the user;
   providing, to the user, information associated with a book selected from the one or more books by the user using the user interface, wherein the information comprises an image of the book, a price of the book and a description of the book, and wherein the information is absent the full text of the book;
   making the full text of the book inaccessible to the user via the electronic commerce computer site; and
   performing a transaction in which the user uses the electronic commerce computer site to purchase the book.

6. The method of claim 5 wherein the visible representation comprises one or more concave regions to visibly represent the one or more books.

7. The method of claim 5 wherein the visible representation and the information associated with the book are simultaneously viewable by the user.

8. A system comprising:
   a computer system to provide an electronic commerce computer site, the computer system to:
   receive a search expression entered by a user, the search expression comprising one or more words;
   perform a search to find one or more books of interest to the user based on a similarity between the search expression and a corresponding full text of each of a plurality of books that are purchasable via the electronic commerce computer site;
   perform a transaction in which the user uses the electronic commerce computer site to purchase a book user-selected from the one or more books; and make the full text of the book inaccessible to the user via the electronic commerce computer site prior to performing the transaction.

9. A system comprising:
a computer system to provide an electronic commerce computer site, the computer system to:
receive a search expression entered by a user, the search expression comprising one or more words;
perform a search to find one or more books of interest to the user based on a similarity between the search expression and a corresponding full text of each of a plurality of books that are purchasable via the electronic commerce computer site;
provide, to the user, information associated with a book user-selected from the one or more books after performing the search, wherein the information comprises an image of the book and a price of the book, and wherein the information is absent the full text of the book;
make the full text of the book inaccessible to the user via the electronic commerce computer site; and
perform a transaction in which the user uses the electronic commerce computer site to purchase the book.

10. A system comprising:
a computer system to provide a computer site, the computer system to:
receive a search expression entered by a user, the search expression comprising one or more words;
perform a search to find one or more purchasable books of interest to the user based on a similarity between the search expression and a corresponding full text of each of a plurality of purchasable books;
output at least one signal from the computer site to provide a visible representation of the one or more purchasable books to the user; and
make the corresponding full text of each of the one or more purchasable books inaccessible to the user via the computer site.

11. The system of claim 10 wherein the visible representation comprises one or more concave regions to visibly represent the one or more purchasable books.

12. A system comprising:
a computer system to provide an electronic commerce computer site, the computer system to:
receive a search expression entered by a user, the search expression comprising one or more words;
perform a search to find one or more books of interest to the user based on a similarity between the search expression and a corresponding full text of each of a plurality of books that are purchasable via the electronic commerce computer site;
output at least one signal from the electronic commerce computer site to provide a user interface comprising a visible representation of the one or more books to the user;
provide, to the user, information associated with a book selected from the one or more books by the user using the user interface, wherein the information comprises an image of the book, a price of the book and a description of the book, and wherein the information is absent the full text of the book;
make the full text of the book inaccessible to the user via the electronic commerce computer site; and
perform a transaction in which the user uses the electronic commerce computer site to purchase the book.

13. The system of claim 12 wherein the visible representation comprises one or more concave regions to visibly represent the one or more books.

14. The system of claim 12 wherein the visible representation and the information associated with the book are simultaneously viewable by the user.

15. A computer-readable medium having computer-readable program code to cause a computer system which provides an electronic commerce computer site to:
receive a search expression entered by a user, the search expression comprising one or more words;
perform a search to find one or more books of interest to the user based on a similarity between the search expression and a corresponding full text of each of a plurality of books that are purchasable via the electronic commerce computer site;
perform a transaction in which the user uses the electronic commerce computer site to purchase a book user-selected from the one or more books; and
make the full text of the book inaccessible to the user via the electronic commerce computer site prior to performing the transaction.

16. A computer-readable medium having computer-readable program code to cause a computer system which provides an electronic commerce computer site to:
receive a search expression entered by a user, the search expression comprising one or more words;
perform a search to find one or more books of interest to the user based on a similarity between the search expression and a corresponding full text of each of a plurality of books that are purchasable via the electronic commerce computer site;
provide, to the user, information associated with a book user-selected from the one or more books after performing the search, wherein the information comprises an image of the book and a price of the book, and wherein the information is absent the full text of the book;
make the full text of the book inaccessible to the user via the electronic commerce computer site; and
perform a transaction in which the user uses the electronic commerce computer site to purchase the book.

17. A computer-readable medium having computer-readable program code to cause a computer system which provides a computer site to:
receive a search expression entered by a user, the search expression comprising one or more words;
perform a search to find one or more purchasable books of interest to the user based on a similarity between the search expression and a corresponding full text of each of a plurality of purchasable books;
output at least one signal from the computer site to provide a visible representation of the one or more purchasable books to the user; and
make the corresponding full text of each of the one or more purchasable books inaccessible to the user via the computer site.

18. The computer-readable medium of claim 17 wherein the visible representation comprises one or more concave regions to visibly represent the one or more purchasable books.

19. A computer-readable medium having computer-readable program code to cause a computer system which provides an electronic commerce computer site to:
receive a search expression entered by a user, the search expression comprising one or more words;

perform a search to find one or more books of interest to the user based on a similarity between the search expression and a corresponding full text of each of a plurality of books that are purchasable via the electronic commerce computer site;

output at least one signal from the electronic commerce computer site to provide a user interface comprising a visible representation of the one or more books to the user;

provide, to the user, information associated with a book selected from the one or more books by the user using the user interface, wherein the information comprises an image of the book, a price of the book and a description of the book, and wherein the information is absent the full text of the book;

make the full text of the book inaccessible to the user via the electronic commerce computer site; and perform a transaction in which the user uses the electronic commerce computer site to purchase the book.

20. The computer-readable medium of claim 19 wherein the visible representation comprises one or more concave regions to visibly represent the one or more books.

21. The computer-readable medium of claim 19 wherein the visible representation and the information associated with the book are simultaneously viewable by the user.

22. A system comprising:
a computer system to provide a computer site, the computer system to:

receive a search expression entered by a user, the search expression comprising one or more words;

perform a search to find one or more purchasable books of interest to the user based on a similarity between the search expression and a corresponding full text of each of a plurality of purchasable books;

provide a link from the computer site to a computer address at which a book from the one or more purchasable books can be purchased by the user; and make the corresponding full text of the book inaccessible to the user via the computer site.

23. A computer-readable medium having computer-readable program code to cause a computer system which provides a computer site to:

receive a search expression entered by a user, the search expression comprising one or more words;

perform a search to find one or more purchasable books of interest to the user based on a similarity between the search expression and a corresponding full text of each of a plurality of purchasable books;

provide a link from the computer site to a computer address at which a book from the one or more purchasable books can be purchased by the user; and make the corresponding full text of the book inaccessible to the user via the computer site.

* * * * *